United States Patent [19]

Dvorak et al.

[11] Patent Number: 5,825,643
[45] Date of Patent: Oct. 20, 1998

[54] PROGRAMMING DEVICE FOR A CIRCUIT BREAKER

[75] Inventors: Robert F. Dvorak, Mt. Vernon; Jerry R. Baack, Cedar Rapids, both of Iowa

[73] Assignee: Square D Company, Palatine, Ill.

[21] Appl. No.: 112,018

[22] Filed: Aug. 25, 1993

[51] Int. Cl.$^6$ .............................. G05B 11/01; H02H 3/08
[52] U.S. Cl. .............................. 364/140; 361/93; 361/96
[58] Field of Search .................... 364/140, 483, 364/141–147; 361/64, 93, 96, 97, 42, 43, 47, 48, 392

[56] References Cited

U.S. PATENT DOCUMENTS

| | | | |
|---|---|---|---|
| 4,318,156 | 3/1982 | Gallagher | 361/358 |
| 4,751,605 | 6/1988 | Mertz et al. | 361/91 |
| 4,945,443 | 7/1990 | De Biasi et al. | 361/93 |
| 4,991,042 | 2/1991 | Tokarshi et al. | 361/93 |
| 4,996,646 | 2/1991 | Farrington | 364/483 |
| 5,012,495 | 4/1991 | Munroe et al. | 337/3 |
| 5,136,457 | 8/1992 | Durivage | 361/93 |
| 5,164,875 | 11/1992 | Haun et al. | 361/64 |
| 5,185,705 | 2/1993 | Farrington | 364/483 |
| 5,231,565 | 7/1993 | Bilas et al. | 364/140 |

*Primary Examiner*—Paul P. Gordon
*Assistant Examiner*—Thomas E Brown
*Attorney, Agent, or Firm*—Larry I. Golden; Kareem M. Irfan; Wayne H. Stoppelmoor

[57] ABSTRACT

A portable programming device is provided for communicating with and downloading tripping characteristics to a circuit breaker electronic trip unit. The programming device incorporates an umbilical cable which is attached to a connector on the trip unit, over which power is supplied to the trip unit and data is exchanged, a keypad with function keys including On/Off, Function, Breaker/Pane, Sensor and Program keys, and a LCD display which is capable of showing pertinent parameters such as circuit breaker type, sensor size, pickup and delay settings, current flowing through the circuit breaker and the trip characteristics to be downloaded to the trip unit. The portable programming device has a provision to operate from power supplied by a built in battery or from an external AC adapter. The programming device is presented with a fiber optic cable which, when coupled to a trip unit which is attached to a powered circuit breaker, can pass data to the device display.

49 Claims, 20 Drawing Sheets

PROGRAMMING DEVICE FOR A CIRCUIT BREAKER

FIELD OF THE INVENTION

The present invention relates generally to circuit breaker trip units and, more particularly, to peripheral programming devices communicating with circuit breaker trip units.

BACKGROUND OF THE INVENTION

Increasing sophistication in trip units for electronic trip circuit breakers has resulted in an ever increasing amount of hardware to be packaged within a circuit breaker. Circuit designers are constantly seeking methods of streamlining the hardware in an attempt to shrink the package size. Traditionally, circuit breaker frame sizes have utilized a universal electronic trip unit which incorporates switches to set circuit breaker trip characteristics, such as frame size. The microprocessor on the trip unit reads these switch settings and tailors the trip characteristics accordingly. The switches add significant bulk to the trip unit package and there exists a distinct need to eliminate the switches, thereby shrinking the package size. However, eliminating the switches creates the need for a peripheral device for programming the setting of circuit breaker trip unit characteristics.

In order to program the trip unit with the circuit breaker parameter information an external power supply is required to supply power to the trip unit. It is desirable to perform the remote parameter programming with a portable peripheral unit which can be operated with a small number of readily available batteries, or from an AC adapter, while providing the power required by the trip unit for the programming function.

SUMMARY OF THE INVENTION

It is a general object of the present invention to provide a portable device for communicating with a circuit breaker trip unit.

It is a more specific object of the present invention to provide a portable programming device which can download tripping characteristics to a universal trip unit for installation in a plurality of circuit breaker frame sizes.

In accordance with a preferred embodiment, the present invention provides a programming device for programming a circuit breaker trip unit having a keypad, a display, a local power source which provides power to the programming device, and interface means for coupling data sent to and from the trip unit with the programming device. Additionally, the programming device includes a control circuit which interprets signals from the keypad, controls the display, transmits data to the trip unit which programs the trip unit with circuit breaker tripping characteristics which are provided to the control circuit from the keypad, and requests and receives data from the trip unit. Although it is preferred to request and receive data from the trip unit during the programming operation, it is not necessary to do so.

The present invention provides a portable programming device or programmer which downloads tripping characteristics to a universal trip unit that can be installed in a plurality of circuit breaker frame sizes. The programmer incorporates an umbilical cable which is attached to a connector on the trip unit, over which power is supplied to the trip unit and data is exchanged. A keypad on the front of the portable programmer has several function keys including On/Off, Function, Breaker/Pane, Sensor and Program keys. The programmer has an LCD display which is capable of showing circuit breaker type, sensor size, pickup and delay settings, current flowing through the circuit breaker and the trip characteristics which are ready to be downloaded to the trip unit. The portable programming device has a provision to operate from power supplied by a built in battery or from an external AC adapter. The programmer has a fiber optic cable which, when coupled to a trip unit which is attached to an already powered circuit breaker, can pass data to the portable programmer for display.

BRIEF DESCRIPTION OF THE DRAWINGS

Other objects and advantages of the invention will be apparent from the following detailed description and the accompanying drawings in which.

Figure 1:
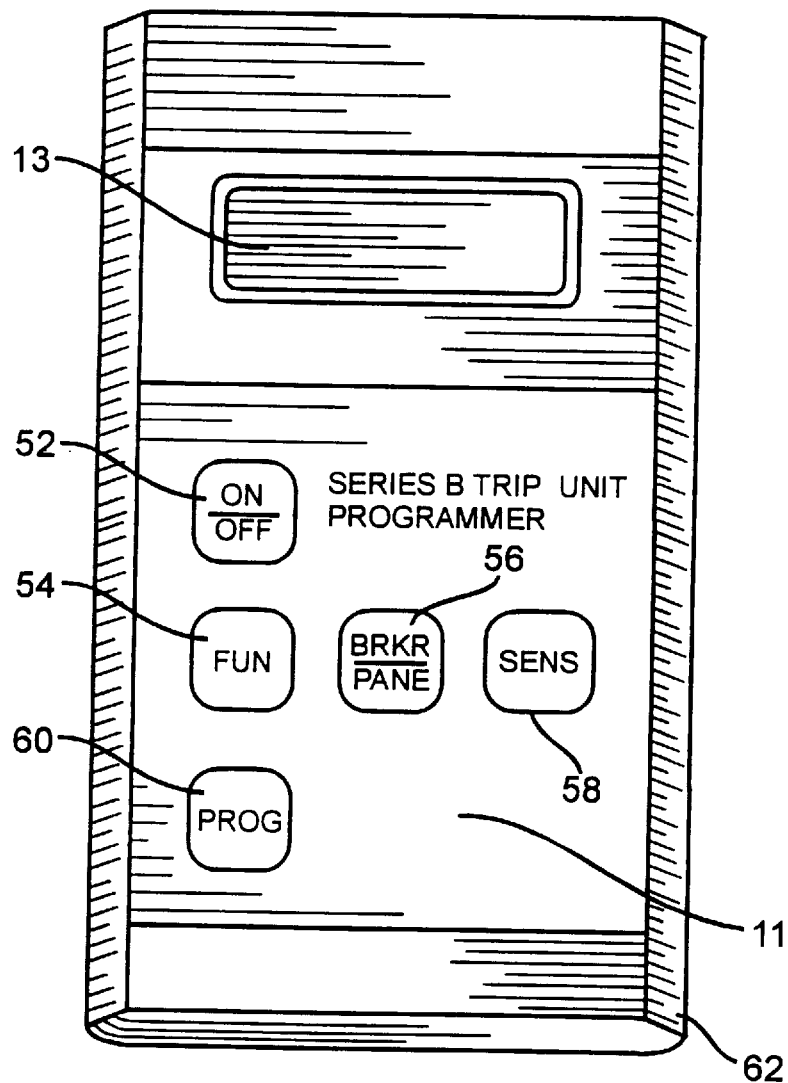
FIG. 1 is a perspective view of a portable programming device, in accordance with the present invention, for programming a circuit breaker trip system.

While the invention is susceptible to various modifications and alternative forms, a specific embodiment thereof has been shown by way of example in the drawings and will be described in detail. It should be understood, however, that it is not intended to limit the invention to the particular form described, but, on the contrary, the invention is to cover all modifications, equivalents, and alternatives falling within the spirit and scope of the invention as defined by the appended claims.

DETAILED DESCRIPTION OF THE PREFERRED EMBODIMENT

Referring now to FIG. 1, a portable programming device 50 is shown in a perspective view having a rectangular housing 62. The programming device 50 has a keypad 11 having a ON/OFF key 52, FUNCTION key 54, BREAKER/PANE key 56, SENSOR key 58 and PROGRAM key 60 which correspond respectively to momentary switches SW1–SW5 (shown in FIG. 7). The programming device also has a display 13, which is preferably implemented using a LCD (liquid crystal display) manufactured by Densitron having a part number LM73B4C16CSG.

Figure 2:
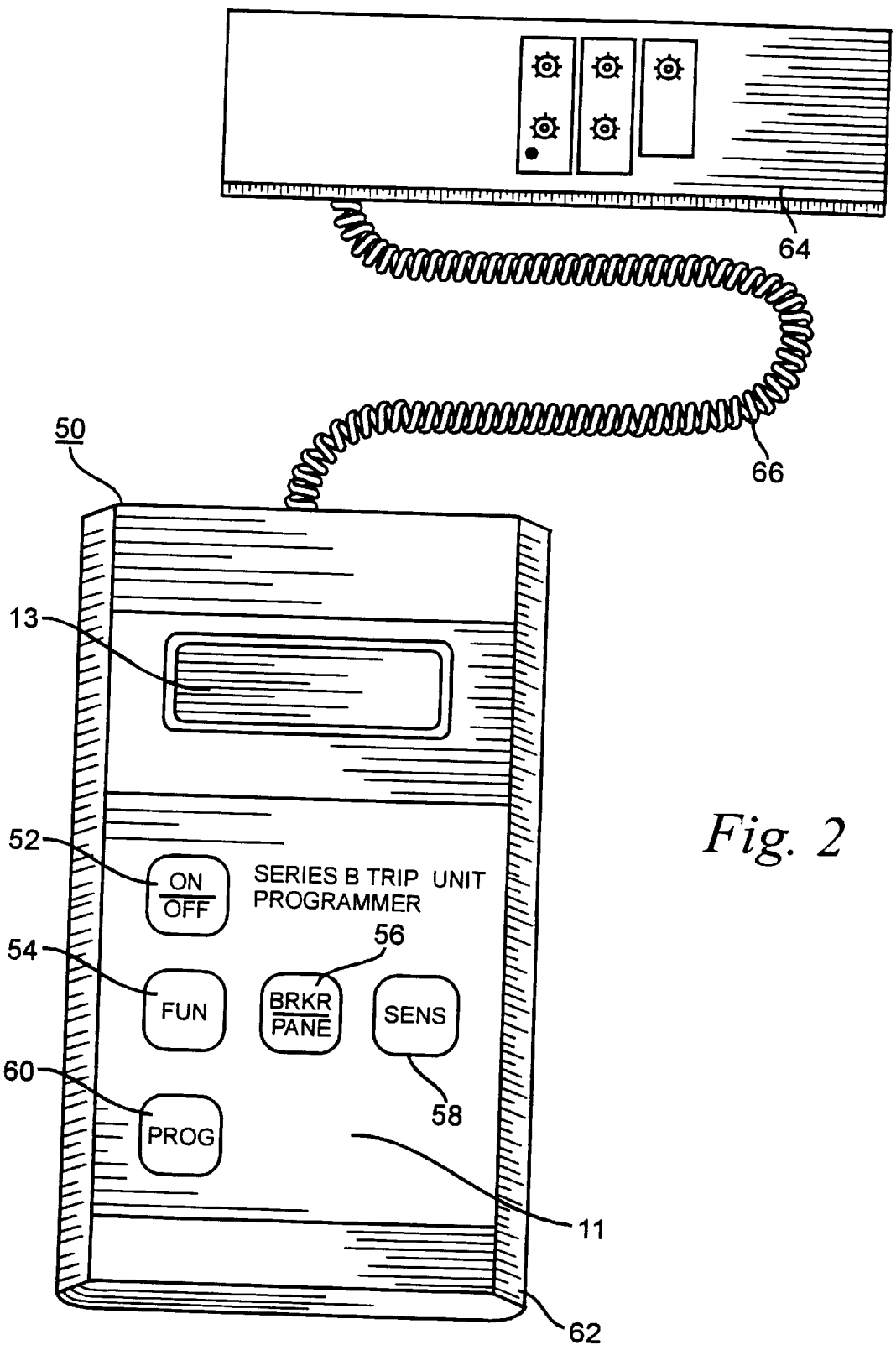
FIG. 2 is a perspective view of the portable programming device being electrically coupled to a electronic trip unit with an umbilical cable.

FIG. 2 shows the programming device 50 electrically coupled to a circuit breaker electronic trip unit 64 via. an umbilical cable 66. The portable programming device 50 is used to program and display a variety of trip characteristics in a circuit breaker electronic trip unit 64, or to monitor operation of the trip unit 64. The programming device 50 transmits trip unit characteristics to the trip unit 64. Additionally, the programming device 50 requests and receives data from the trip unit 64 for displaying on the display 13. Whenever the programming device 50 is not receiving data communications from the trip unit 64 a blinking cursor is displayed in the display 13.

Figure 16:
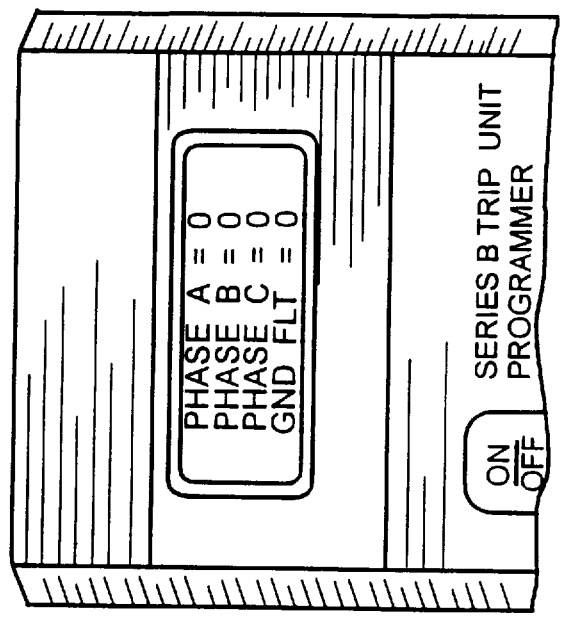
FIGS. 15–22 are partial perspective views of the portable programming device shown in FIG. 1 showing various display modes shown in a display of the portable programming device.
Figure 15:
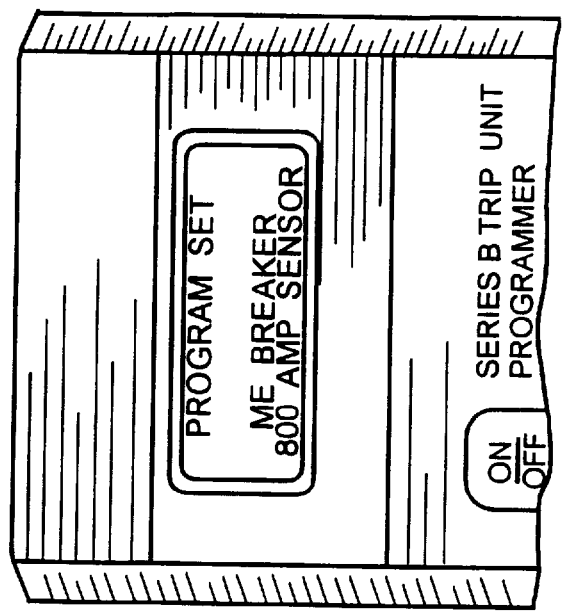
Figure 18:
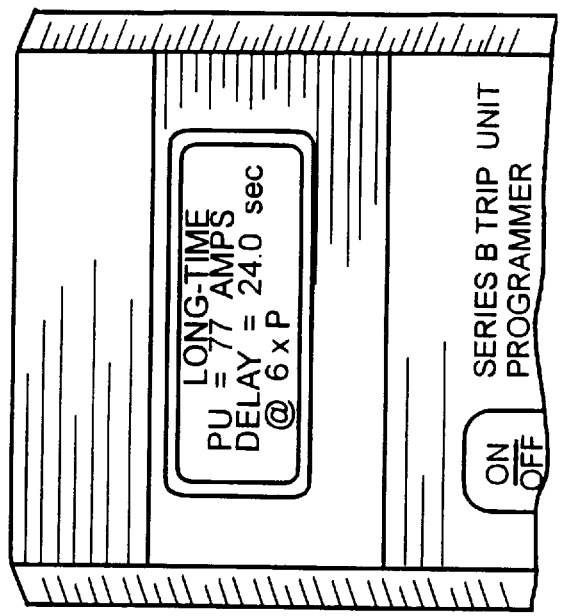
Figure 17:
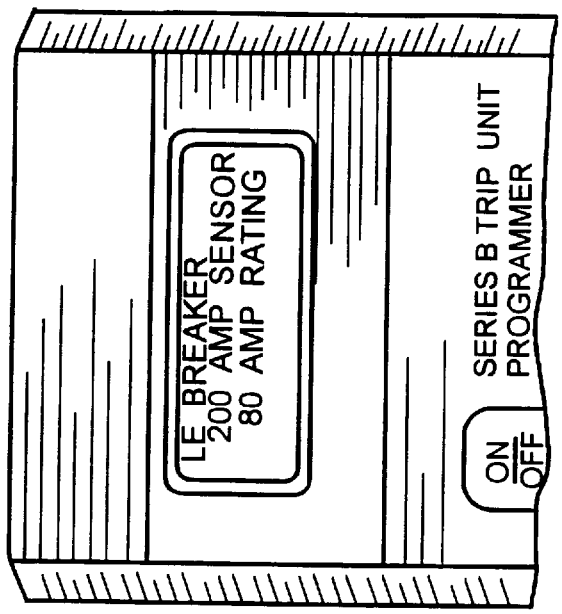
Figure 20:
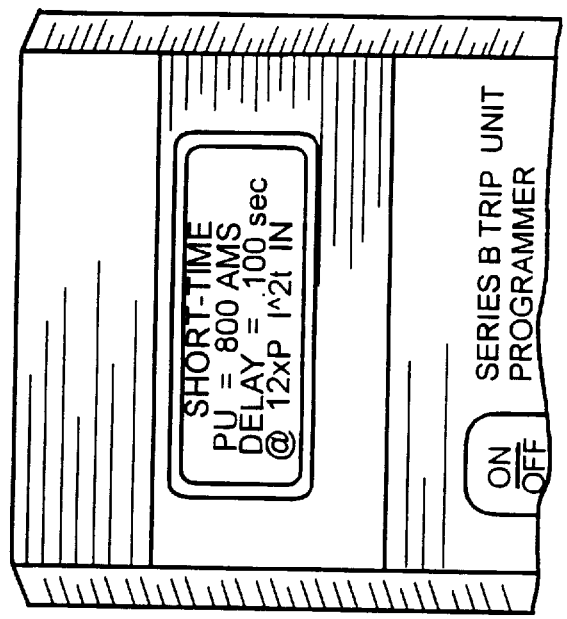
Figure 19:
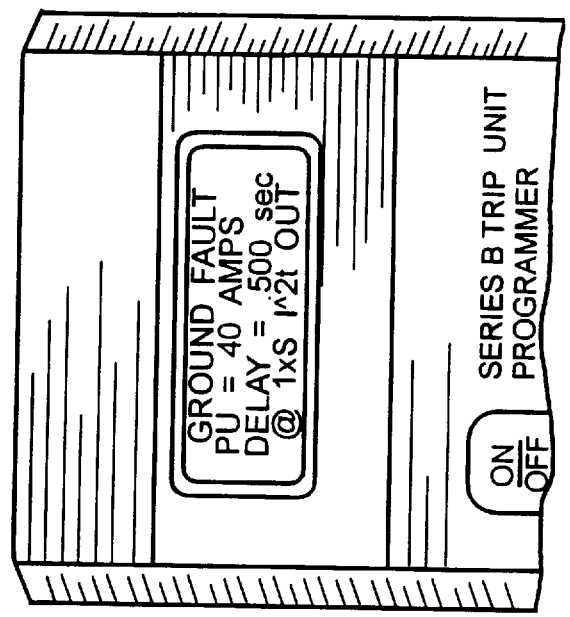
Figure 21:
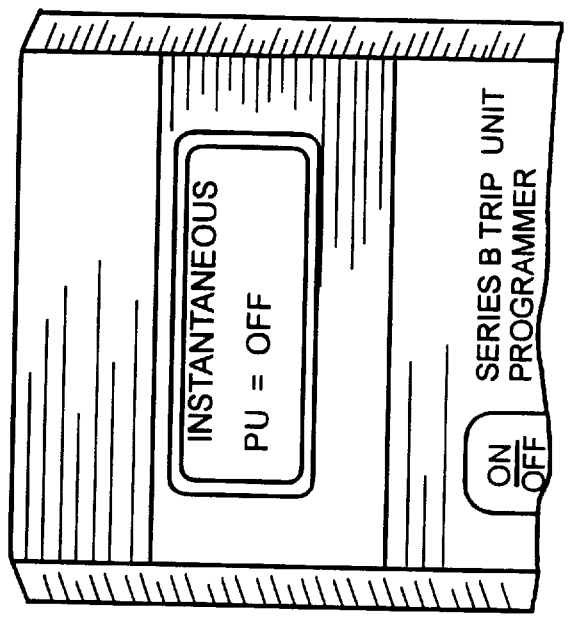
Figure 22:
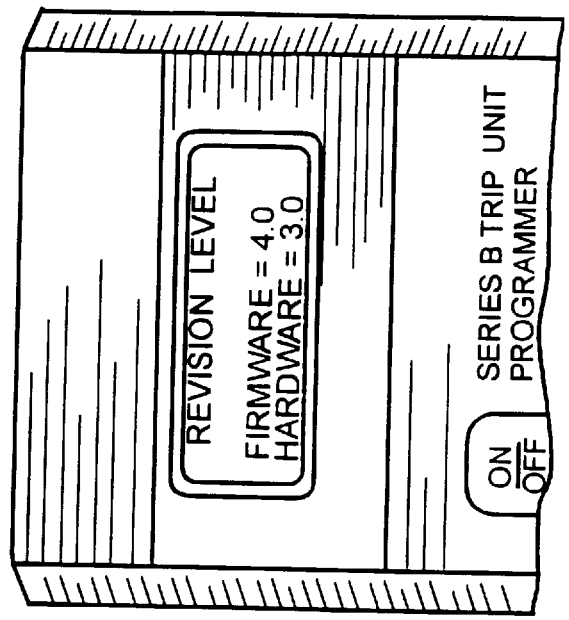

To monitor a circuit breaker not in service, the umbilical cable 66 is connected from the portable programming device 50 to a connector on the trip unit 64. The umbilical cable 66 provides power to the trip unit along with transferring data transmitted between the programming device and the trip unit. One of the following display modes may be selected to be displayed on the display 13: Preferably, there are three types of display modes that can be selected by pressing the FUNCTION key 54, a current-related information mode, a trip unit configuration (or characteristic) information display mode with six submodes associated therewith, and a trip unit characteristic program mode. The current-related information mode displays the amperage for each of three phases plus ground fault current. When the trip unit characteristic information mode is displayed the six submodes associated therewith are displayed by pressing the BREAKER/PANE key 56 to scroll through the following submodes: a) circuit breaker type, sensor amperes and circuit breaker ampere rating, b) long time pickup and delay, c) short time pickup and delay, d) instantaneous pickup, e) ground fault pickup and delay or f) revision level of firmware and hardware. Pressing the FUNCTION and BREAKER/PANE keys, 54 and 56 respectively, scrolls the display 13 through the above display modes and submodes. Samples of what is displayed on the display 13 during these modes is shown in FIGS. 15–22. For example, FIG. 15 shows the "program set" display, FIG. 16 shows the "current monitor" display, FIG. 17 shows the "breaker" display, FIG. 18 shows the "long time" display, FIG. 19 shows the "ground fault" display, FIG. 20 shows the "short-time" display, FIG. 21 shows the "instantaneous" display and FIG. 22 shows the "revision" display.

To monitor a circuit breaker already in service and through which current is flowing, a fiber optic cable 24 (FIG. 3) is attached to a fiber optic guide (not shown) on the electronic trip unit 64 and to an interface port (not shown) on the portable programming device 50. The same information specified above may also be displayed by utilizing the fiber optic cable connected from the portable programming device 50 to the trip unit 64.

To program the circuit breaker trip characteristics into the trip unit 64, the umbilical cable 66 is utilized. The display 13 is set to the "Program Set" window by pressing the FUNCTION key 54 until the "Program Set" mode is selected. The circuit breaker type and sensor amperes are selected by scrolling through the options by pressing the BREAKER/PANE and SENSOR keys, 56 and 58 respectively. The actual downloading, to the trip unit 64, of the characteristics which are displayed in the "Program Set" window is initiated by pressing the PROGRAM key 60. After the PROGRAM key 60 is pressed the programming device 50 transmits the trip unit characteristics to the trip unit 64 and requests that the trip unit 64 return the data it just received. The programming device 50 tests the data transmitted to the trip unit 64 versus what is received back from it to verify accuracy of the programming operation. If the data checks properly, the operator is so notified by an appropriate message on the display 13. However, if the data does not check properly, a warning message is displayed on the display 13 and an audible alarm is sounded to alert the operator. Additionally, during monitoring modes a blinking cursor in the corner of the display 13 alerts the operator if the portable programming device 50 is not receiving data from the trip unit 64. While this is the preferred mode of operation for programming the trip unit 64, the programming device 50 can transmit data to the trip unit without having the trip unit return the data for verification.

Figure 4:
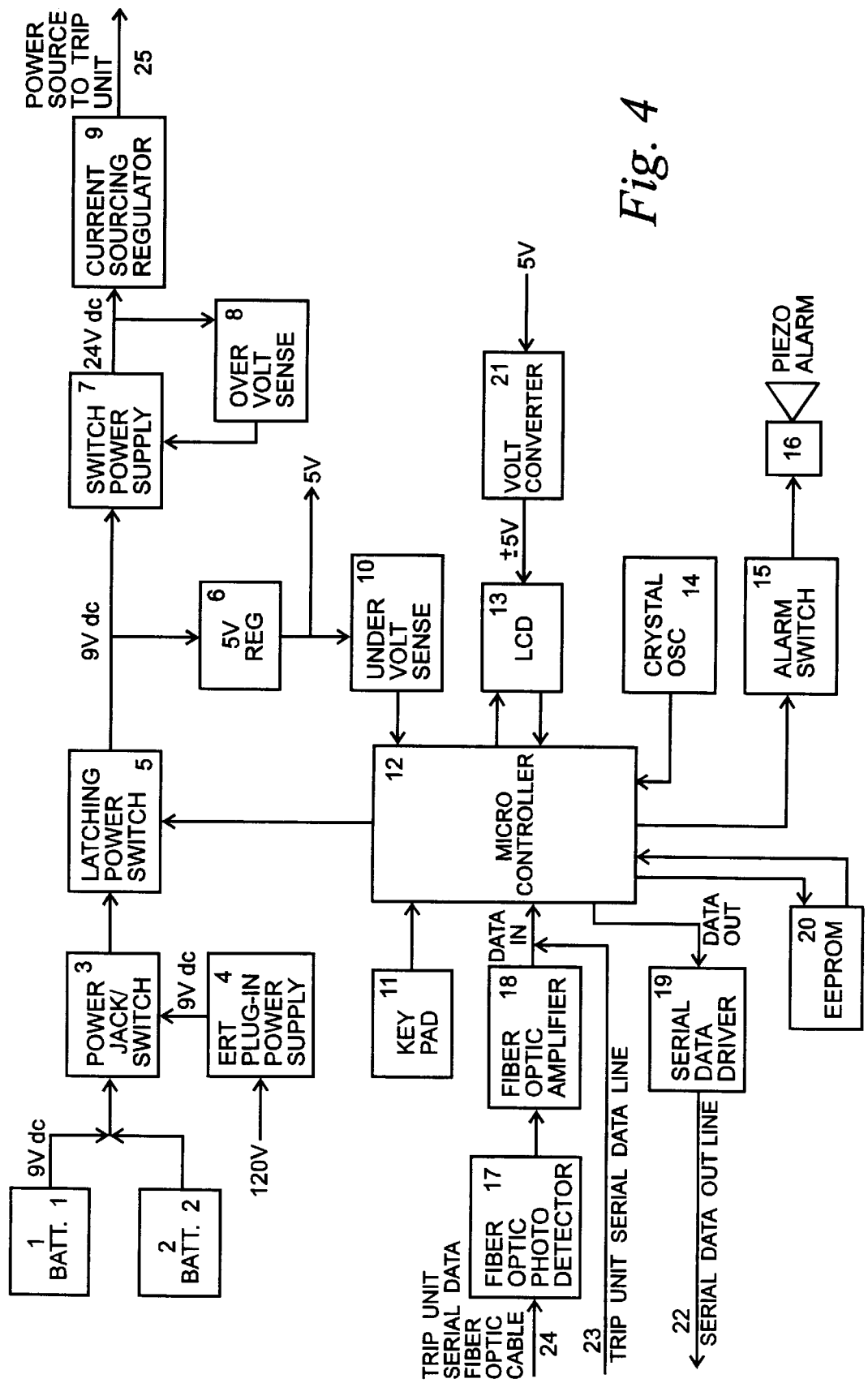
FIG. 4 is a block diagram of the portable programming device shown in FIG. 1.
Figure 5A:
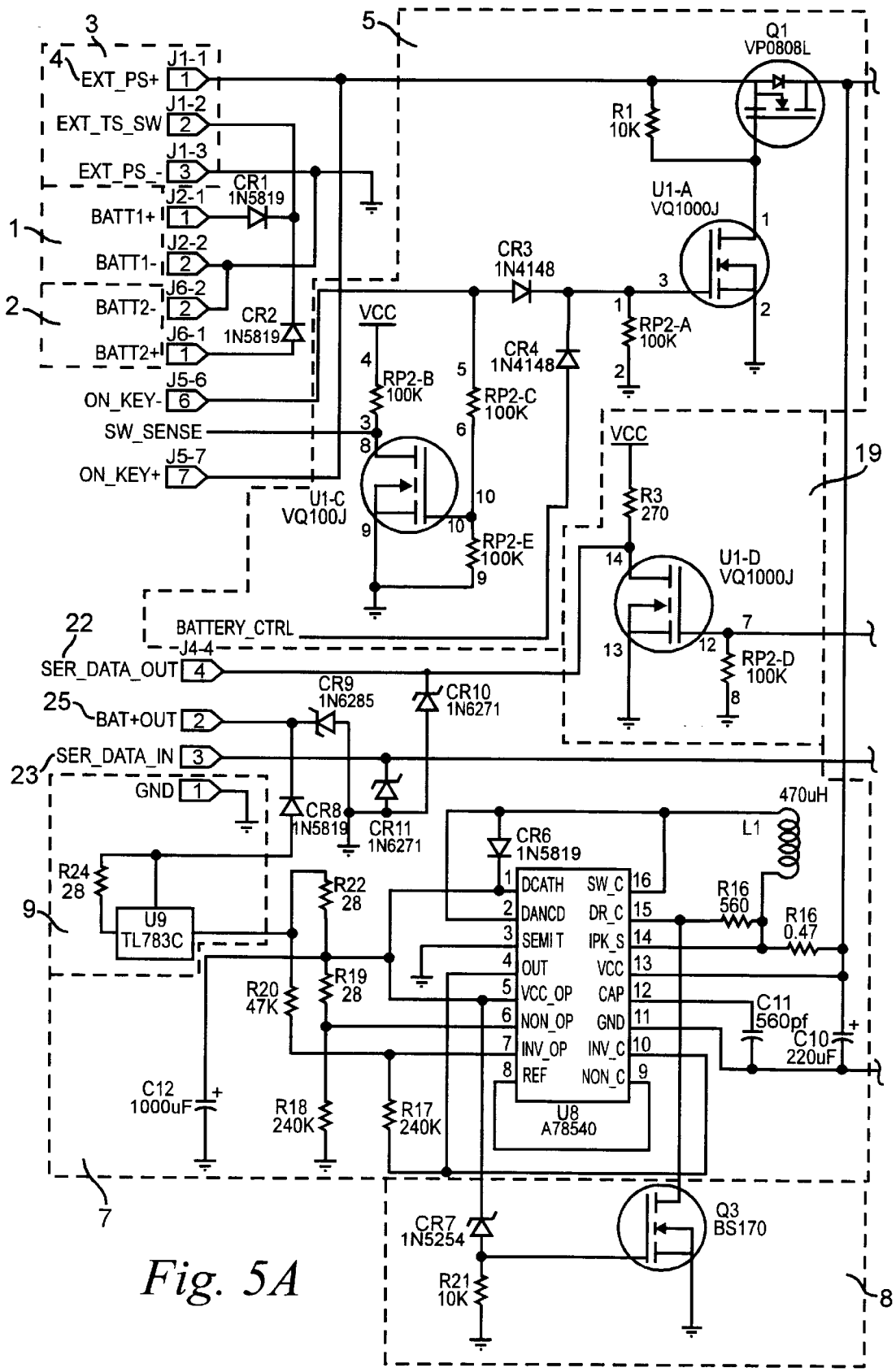
FIGS. 5A–5C together represent the schematic diagram of the portable programming device shown in FIG. 1.
Figure 5B:
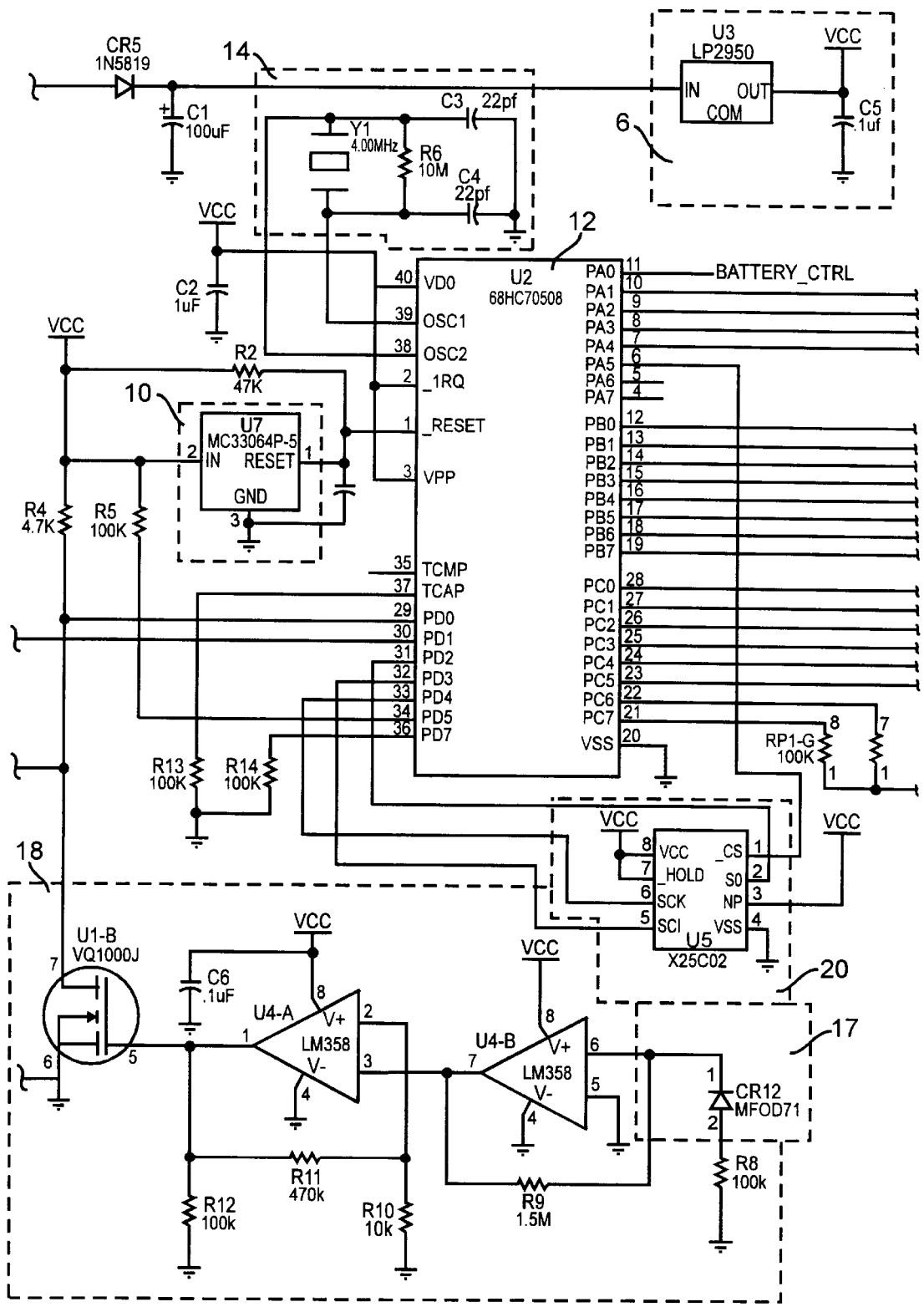
Figure 5C:
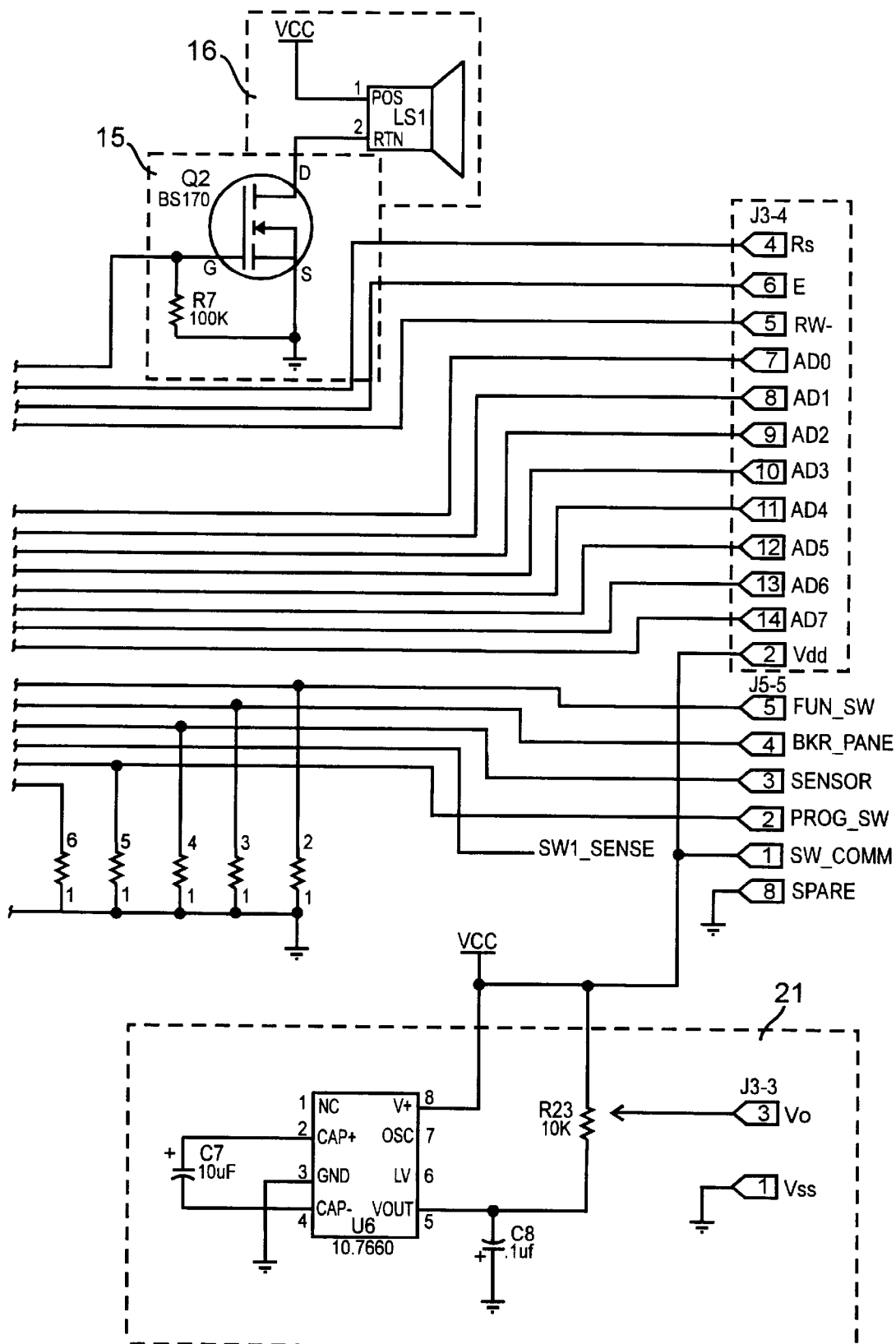
Figure 6:
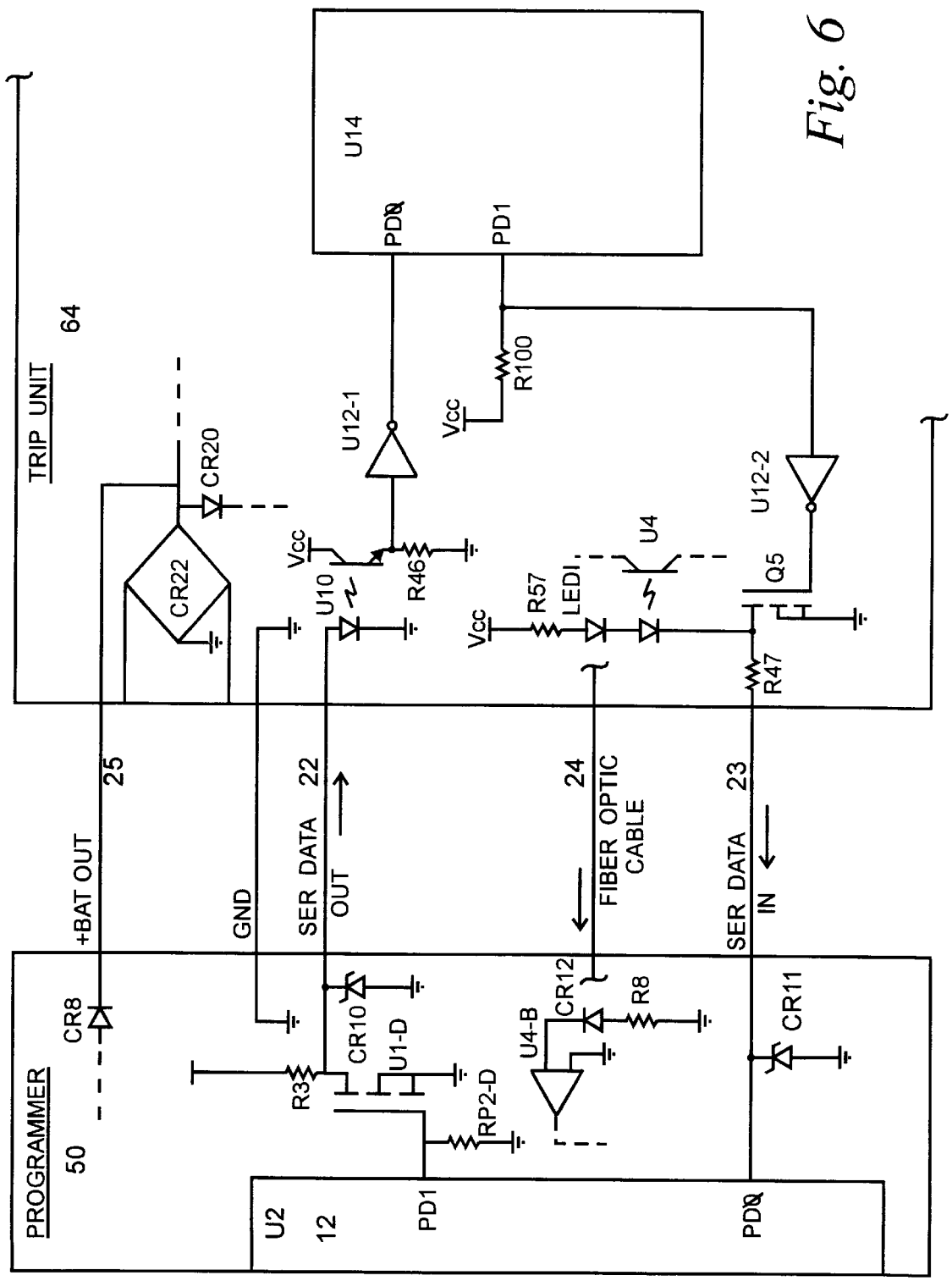
FIG. 6 is a interface schematic of the portable programming device shown in FIG. 1 interfacing it to a circuit breaker trip system.

Now referring to FIGS. 4–6, according to the present invention the programming device utilizes a control circuit to respond to information entered via the keypad, control the display, transmit trip unit characteristics to the trip unit, request data to be sent to the programming device from the trip unit, receive data sent from the trip unit, verify that the circuit breaker tripping characteristics received from the trip unit are the circuit breaker tripping characteristics which the control circuit sent to the trip unit, and send display information to the display 13. The control circuit utilizes the microcomputer or microcontroller 12 to perform the above-stated functions. The programming device and trip unit are coupled together through interface means such as the umbilical cable or fiber optic cable.

Figure 3:
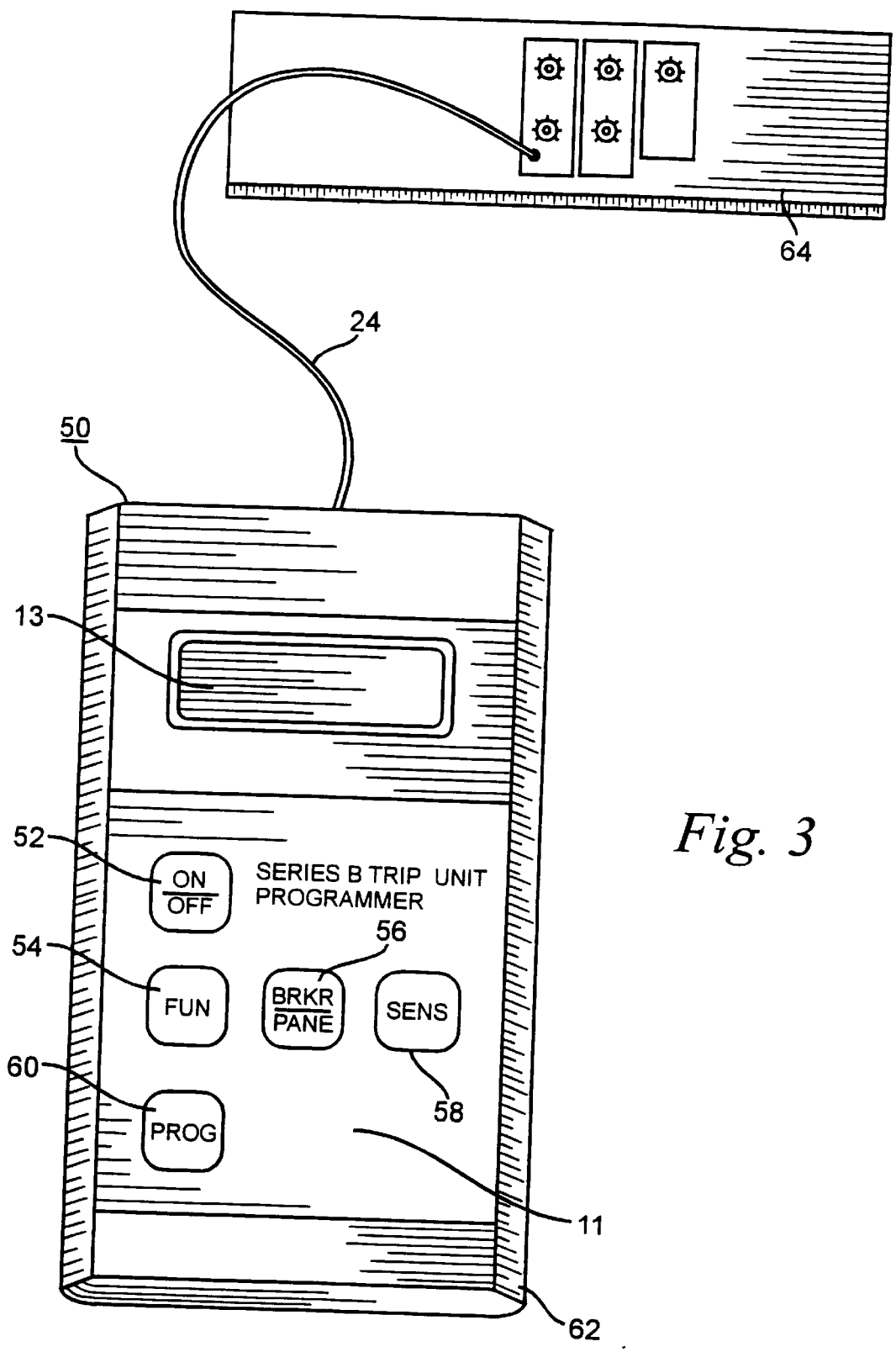
FIG. 3 is a perspective view of the portable programming device being electrically coupled to a electronic trip unit with a fiber optic cable.
Figure 7:
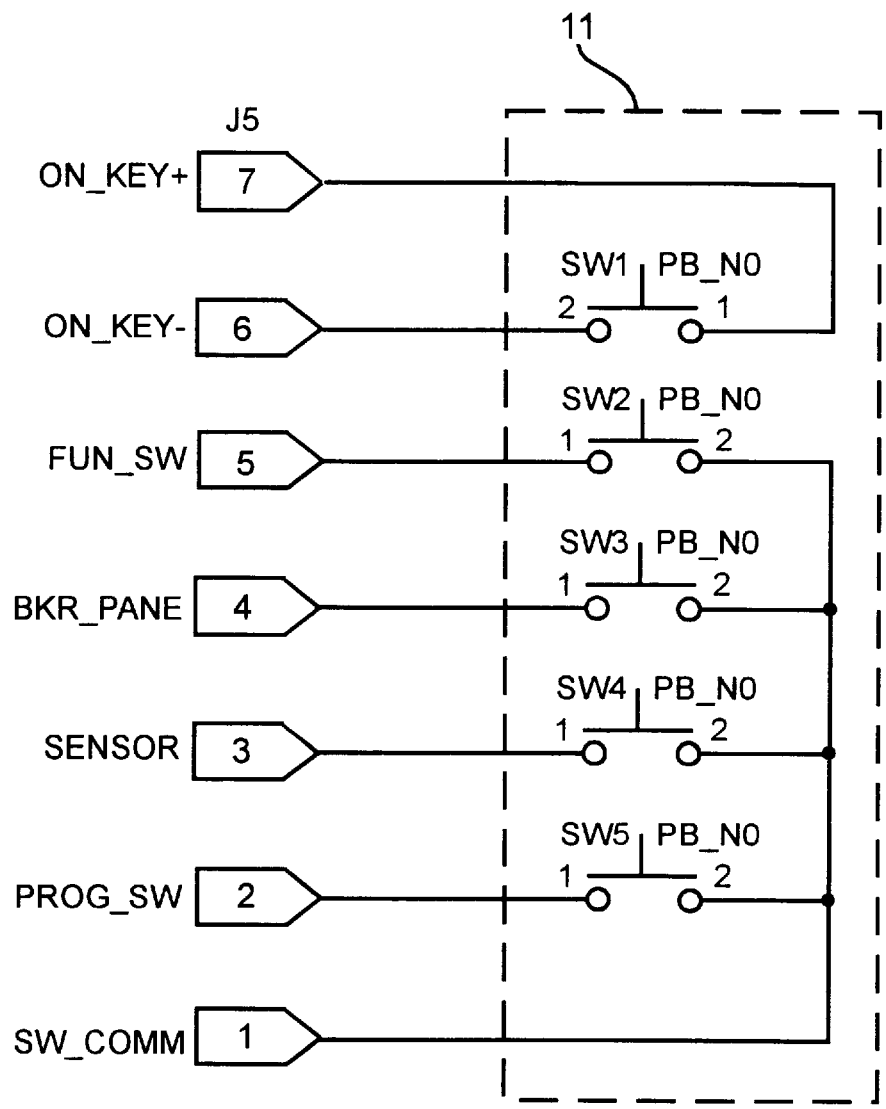
FIG. 7 is schematic of a keypad for the portable programming device shown in FIG. 1.

FIG. 4 is a block diagram of the of the portable programming device 50 showing blocks representing electronic circuitry having reference numbers 1–21. FIGS. 5 illustrates a schematic diagram of the portable programming device 50. The electrical circuitry boxed in dashed lines correspond with the blocks shown in FIG. 4 having similar corresponding reference numbers. FIG. 6 shows an interface circuit of the portable programming device 50, which interfaces the programming device to the trip unit 64 (FIGS. 2 & 3). FIG. 7 is a schematic diagram of the keypad for the portable programming device.

Referring now to FIGS. 4 & 5, a pair of 9V batteries 1 and 2 is shown connected in parallel but isolated from each other by diodes CR1 and CR2. A power jack/switch 3, which is shown on the schematic as J1, is utilized to connect an external power supply 4 or the batteries 1 and 2 to the circuit. When external plug-in power supply 4 is not connected, the jack/switch 3 connects the batteries 1 and 2 to a latching power switch circuit 5. When the external plug-in supply is plugged into the power jack/switch 3, the power jack/switch disconnects the batteries and connects the external 120 Vac/9 Vdc supply to the power switch circuit 5. The power jack/switch is preferably implemented using a Switchcraft #RAPC722 switch.

Pushing an ON/OFF key 52 (FIG. 1) on the keypad 11, which is coupled to the circuit via a connector J5, applies a voltage to the gates of Field Effect Transistors (FET) U1-A and U1-C and turning both transistors on while the key is held down. With U1-A on, the drain of U1-A pulls down the gate of the P channel of FET Q1 thus turning it on. Q1 thus applies power to a 5 V regulator circuit 6, having a regulator U3 and a capacitor C5, causing the system to come on. When Vcc reaches approximately 4.6 V, an undervoltage sensing circuit 10 allows the Reset line of a microcontroller 12 to go high which allows it to start processing. The microcontroller 12, which is shown on the schematic (FIG. 5) as U2, senses a low on the drain of U1-C sensing a request for power and turns on port line PA0, of the microcontroller 12, thus latching U1-A and Q1 into their conductive states, even after the ON key is released. If the ON/OFF key is depressed during operation, the microcontroller senses another low on the drain of U1-C and turns off the port line PA0, thus delatching U1-A and Q1 and turning off the programming device.

With approximately 9 V applied to its Input, the 5 V regulator 6 regulates Vcc very close to 5 V for powering the microcontroller 12 and most of the other circuitry. The display 13 requires +& −5 V for operation. Negative 5 V is supplied by a voltage converter circuit 21 which inverts the 5 V input to provide negative 5 V. The display 13 is coupled to the programmer circuit via connector J3. An adjustable resistor R23 adjusts the viewing angle of the display 13.

Trip units programmed by this device, require approximately 19 V to turn on their power supply and charge up storage capacitors for tripping the circuit breaker. After the storage capacitors are fully charged, the voltage required to maintain trip unit operation is approximately 11.2 V. The trip unit also incorporates a switching voltage regulator which shorts out the input of the trip unit, shunting away excess current as needed to maintain the 11.2 V level. The power supply of the programming device 50 must meet these requirements without wasting excessive power.

A switching power supply 7 boosts the 9 V battery supply 1 and 2 to approximately 24 V at a capacitor C12. The power supply 7 is essentially a conventional step-up switching power supply incorporating a switching regulator integrated circuit U8. U8 causes current through an inductor L1 to be alternately switched from ground to a filter capacitor C12. The additive effect of the inductor voltage and the 9 V power supply causes C12 to charge to a voltage higher than the input. The voltage is regulated to a level controlled by the circuitry in U8. A capacitor C10 serves as a storage element which provides the instantaneous current needed by the switching power supply even though the batteries have a relatively low availability. A resistor R22 is utilized to monitor the current to the trip unit. Resistors R19, R20, R17, and R18 along with an on-board operational amplifier in U8 serve to amplify the voltage drop across R22. The amplified voltage is applied to an on-board comparator circuit in U8 to set the output voltage of the power supply 7 to a level just high enough to maintain operation of the trip unit. However, should the trip unit be disconnected from the programmer, the supply would try to drive the output to maintain current flow, thus driving the output to an undesirably high voltage. An overvoltage sense circuit 8 senses the output level and prevents the voltage across C12 from exceeding approximately 28 V. If the voltage exceeds approximately 27 V, a zener diode CR7 begins to conduct, causing a voltage drop across a resistor R21. A transistor Q3 then turns on and pulls down the source of base current for the driver transistor in U8, thus preventing further switching until the voltage drops below 28 V.

When the switching regulator on the trip unit turns on, the output of the programmer power supply would be shorted were it not for a current sourcing regulator circuit 9. The current regulator circuit 9, consisting of a regulator U9 and a resistor R24 is of conventional design and limits the output current to approximately 45 mA.

The keypad 11 is connected to the microcontroller 12 port lines PC0–PC4.

These lines, which correspond to the ON/OFF key 52, FUNCTION key 54, BREAKER/PANE key 56, SENSOR key 58 and PROGRAM key 60 on the keypad 11, are monitored for activity by the microcontroller. The ON/OFF key 52, FUNCTION key 54, BREAKER/PANE key 56, SENSOR key 58 and PROGRAM key 60 which correspond respectively to switches SW1–SW5 as shown in FIG. 7.

The display 13 is connected to the microcontroller 12 port lines PA2–PA4 and PB0–PB7 via a connector J3. Lines PA2–PA4 are for control functions while lines PB0–PB7 are for data exchange.

A crystal oscillator circuit 14 consists of a crystal Y1 and capacitors C3 and C4, which in conjunction with on-board circuitry in the microcontroller 12, form a 4.000 Mhz crystal oscillator circuit to provide timing.

Referring to FIG. 6, the programming device to trip unit interface schematic is shown. Data transfer to and from the trip unit 64 for the programming operation is via an asynchronous serial communication interface. Data from the programmer 50 to the trip unit 64 originates at port line PD1. If this line goes high, FET U1-D, in a serial data driver circuit 19, turns on which turns off the optocoupler U10 of the trip unit. An inverter U12-1 on the trip unit inverts the low at the emitter of U10 and causes a high to appear at PD0 of the trip unit's microcontroller U14. Likewise, a low at PD1 of programmer microcontroller 12 will cause a low at port PD0 of the trip unit microcontroller U14.

Data transmission from the trip unit 64 to the programmer 50 is initiated at port PD1 of the trip unit microcontroller U14. An inverter U12-2 inverts the data and a LED driver Q5 re-inverts it back to its original polarity before it appears at PD0 of the microcontroller 12. As seen in FIGS. 5 & 6, there are two ways for the programmer to receive data. One is by serial data line 23 and the other by fiber optic cable 24 (shown in FIG. 6). Only one of these is connected at a time however. When receiving data through the fiber optic interface, PD1 of U14 drives LED1 by way of the inverter U12-2 and a FET Q5. The data is coupled to fiber optic cable 24. A diode CR12, in a fiber optic photo detector circuit 17, generates a minute current in response to the light signal from the fiber optic cable. A fiber optic amplifier circuit 18 (see FIG. 5), consisting of op-amp sections U4-A and U4-B, amplifies the current to drive U1-B such that a full 5 V logic level is available at port line PD0 of the microcontroller 12.

Data to be written to or read from an EEPROM U5 (represented as 20 on FIG. 4) is via a synchronous serial peripheral interface. Data from the microcontroller 12 to be written is clocked into the EEPROM U5 on port line PD3 and data to be read from the EEPROM U5 is on port line PD2. Clock signal on port PD4 controls timing for data input and output. The EEPROM U5 is selected for read or write operations by pulling port line PA5 low.

Referring again to FIGS. 4 & 5, at the end of the programming cycle the control circuit requests that the trip unit transmit the trip characteristics which it just received, if the trip characteristics the programming device 50 receives from the trip unit does not agree with that transmitted to the trip unit, the control circuit sends an error message to the display 13 and a piezo or audible alarm 16 is activated. Port line PA1 is toggled on and off causing transistor Q2, of alarm switch circuit 15, to alternately ground and un-ground the return line of an alarm LS1 power supply, which in turn causes a beeping sound. When the Function key is depressed, port line PA1 is turned off, thus clearing the alarm. However, it is possible to program the trip unit without the programming device requesting data to be returned from the trip unit for verification.

Figure 8:
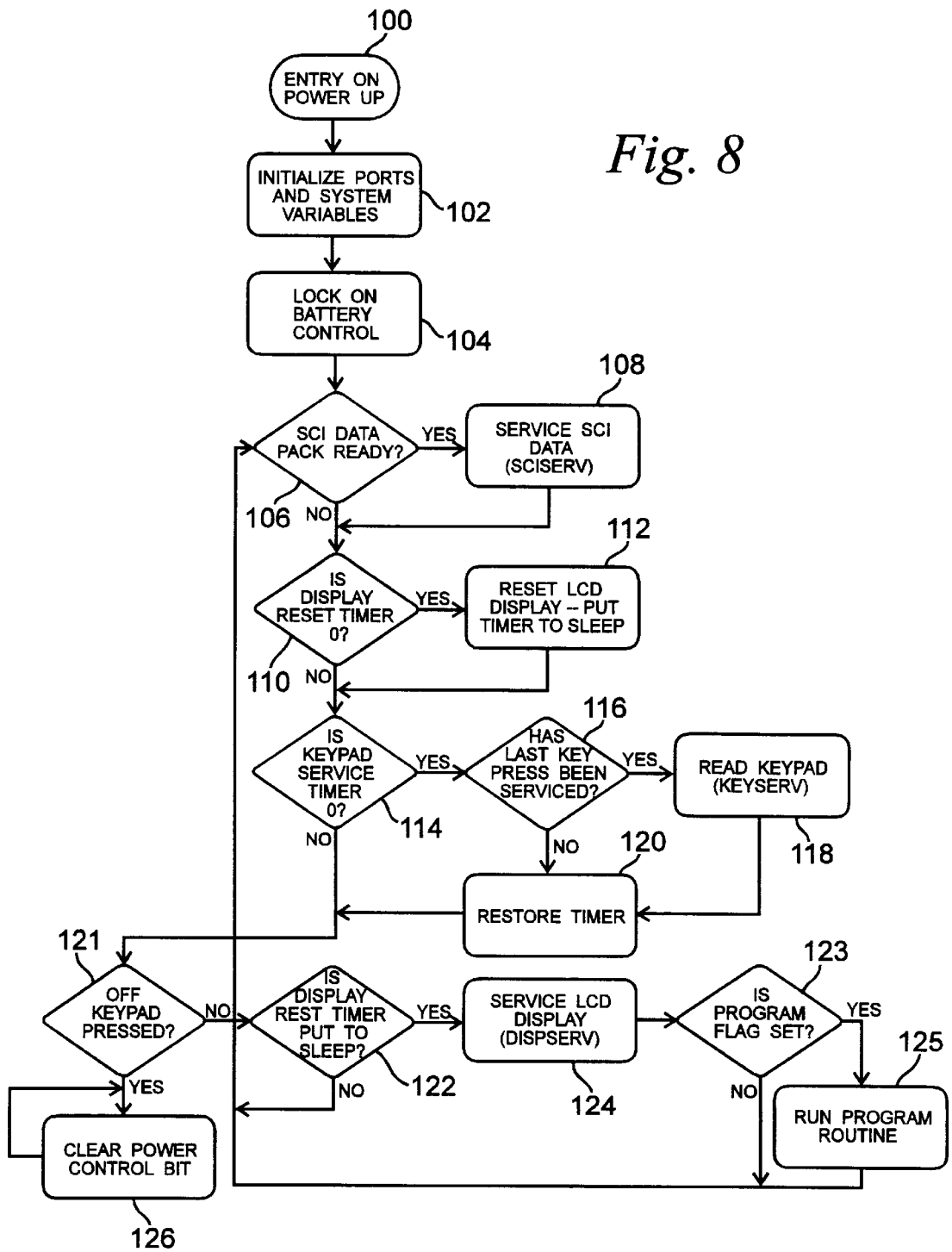
FIGS. 8–14 comprise a flow chart illustrating a preferred manner in which the microcontroller of FIGS. 1–7 may be programmed.
Figure 9:
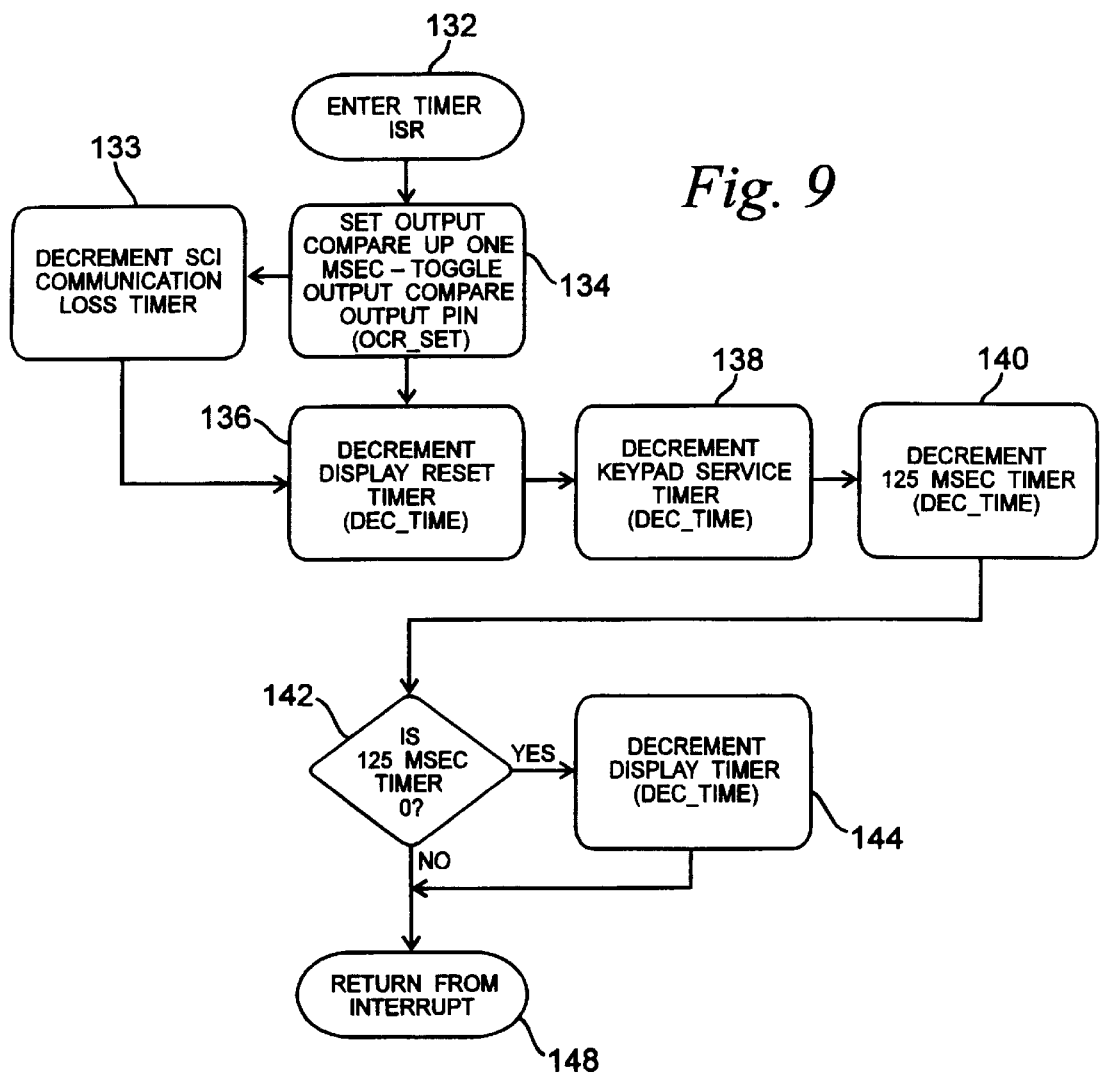
Figure 10:
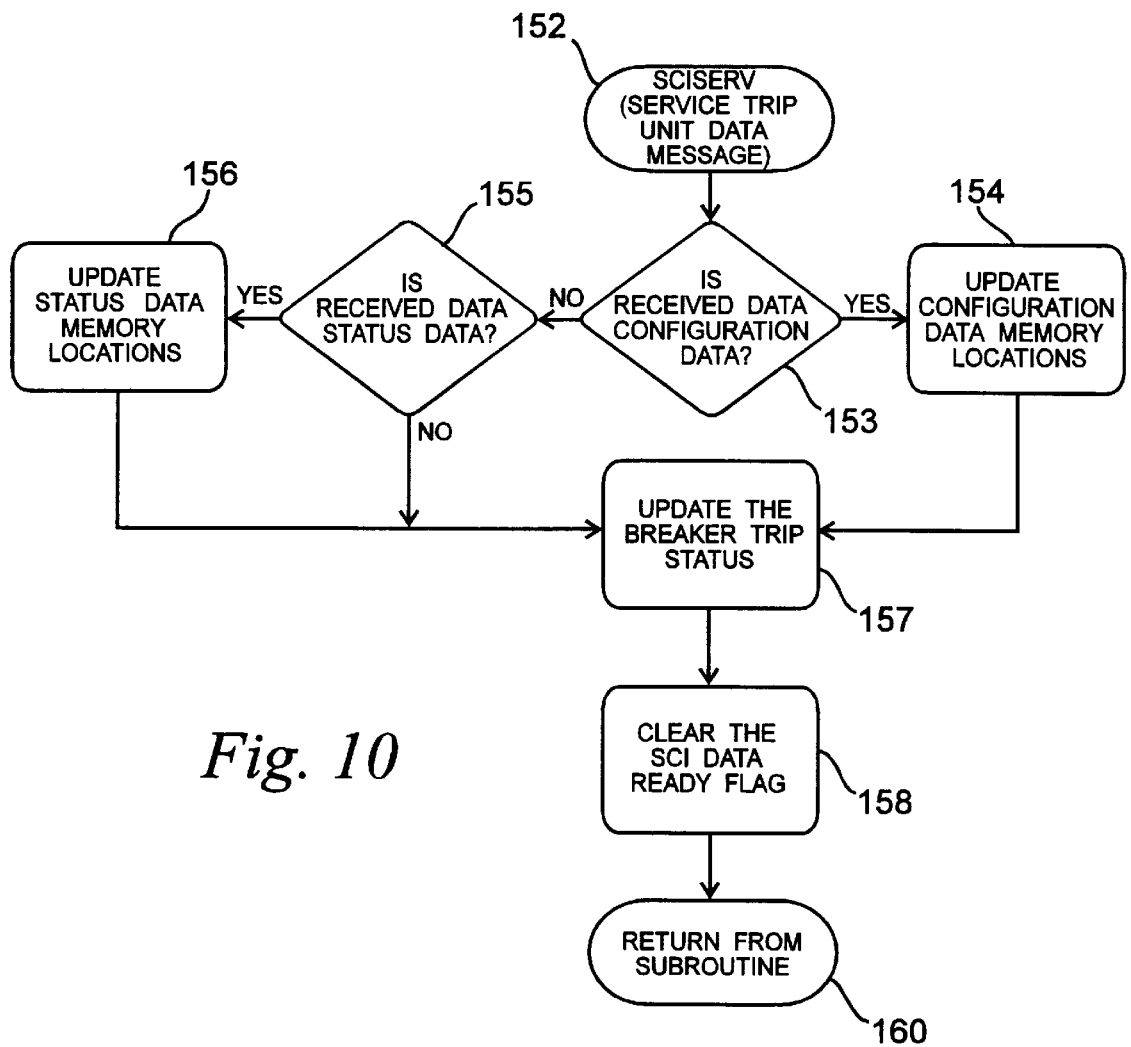
Figure 11:
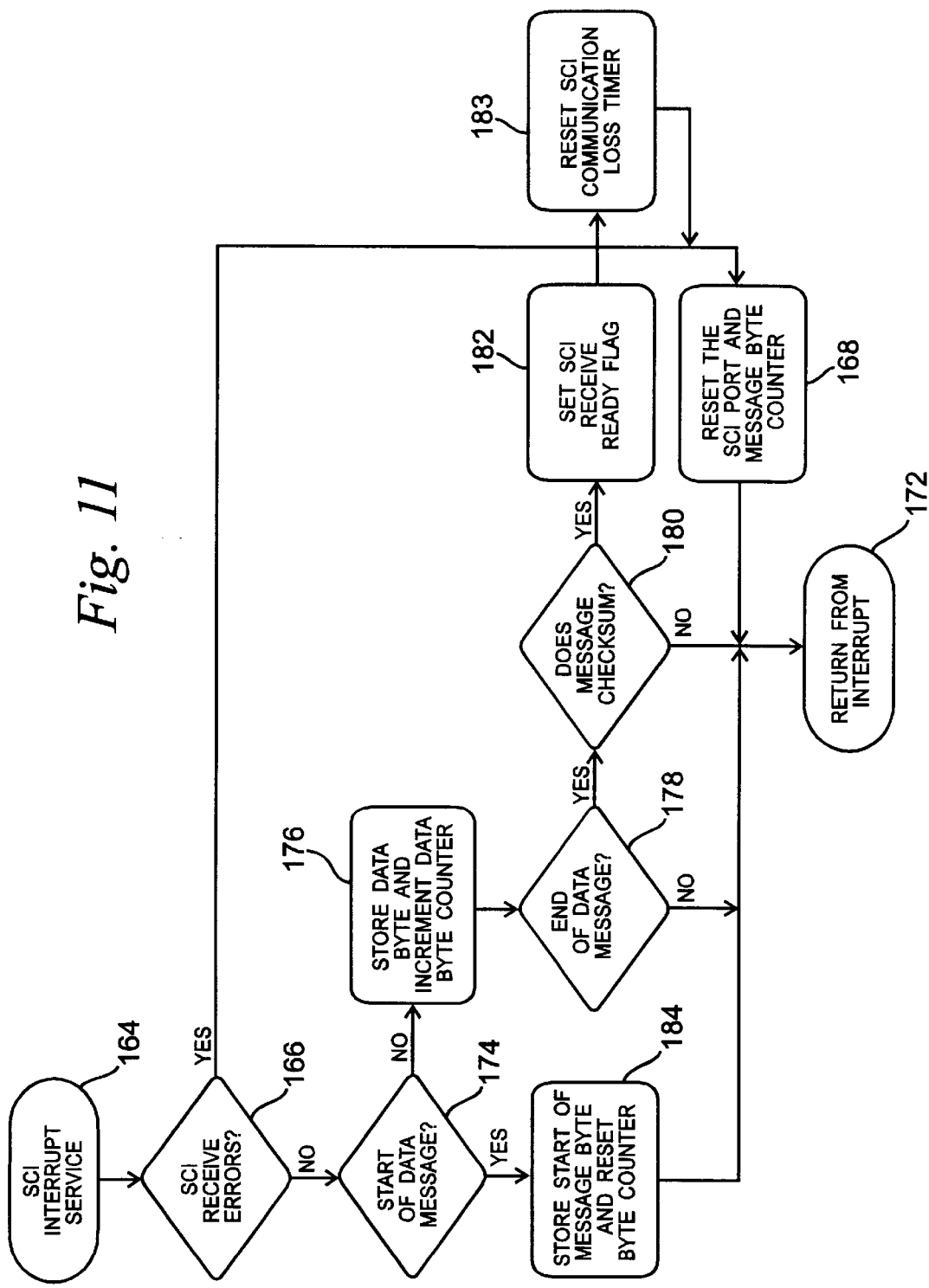
Figure 12:
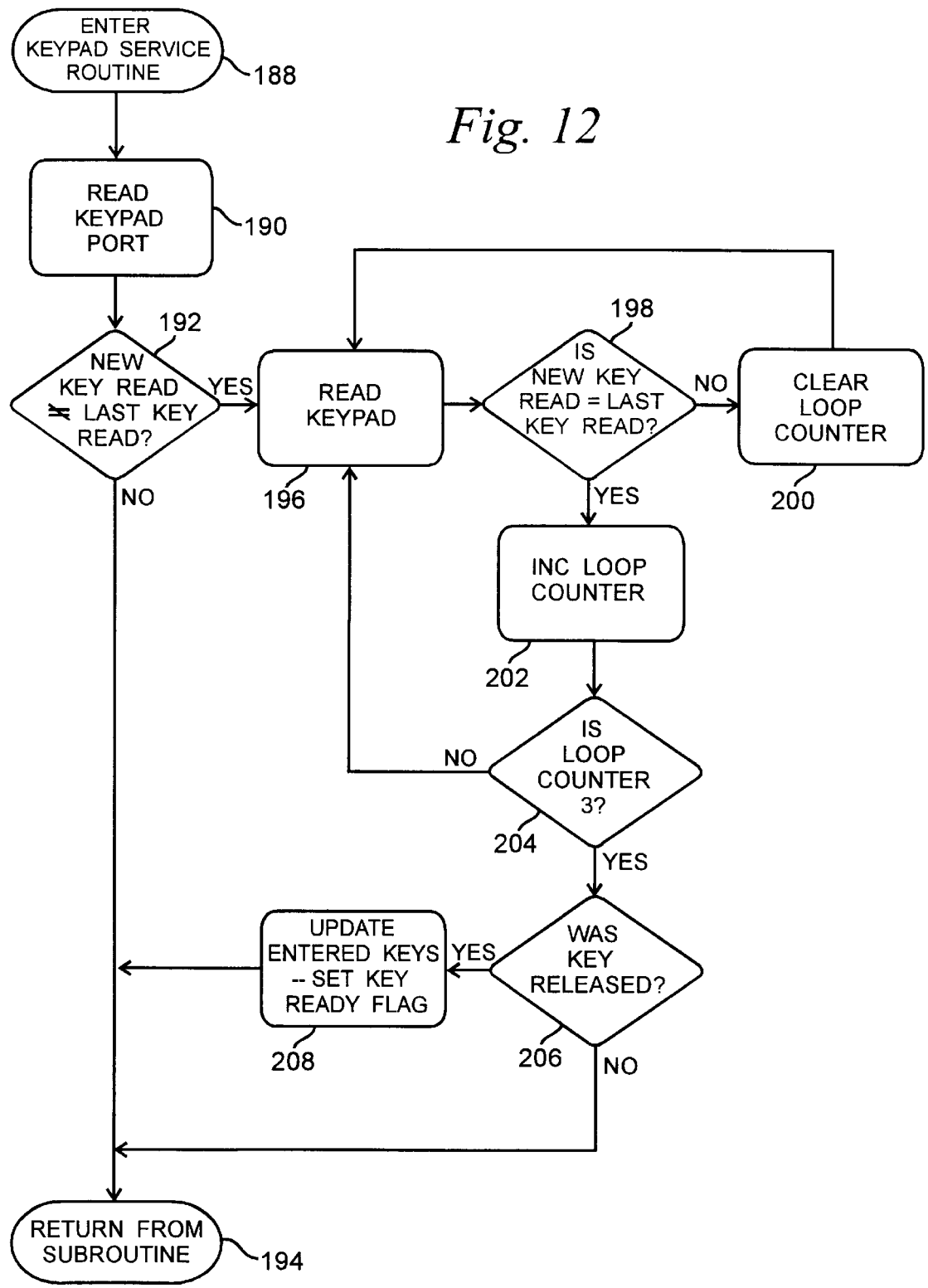
Figure 13:
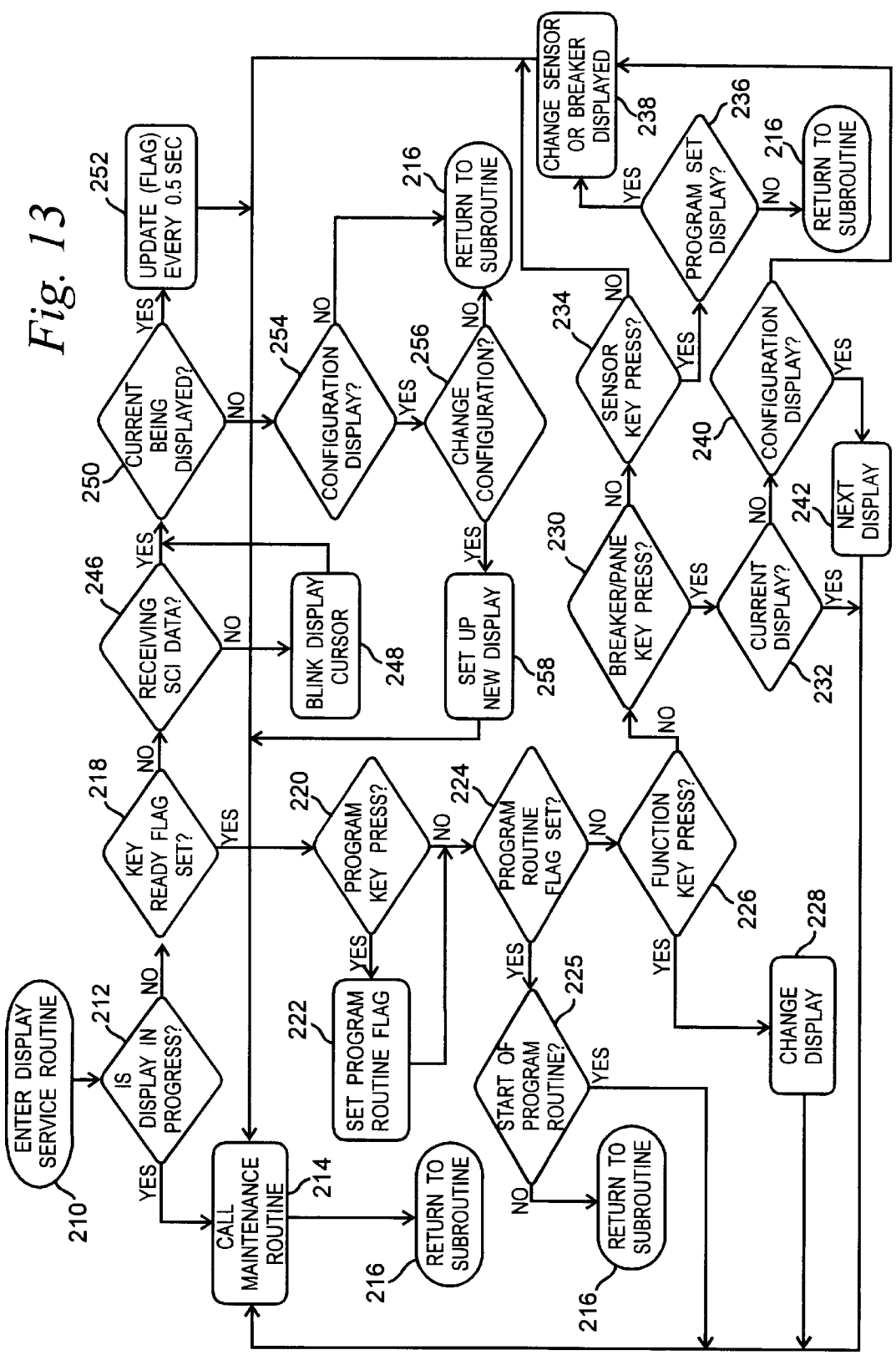
Figure 14:
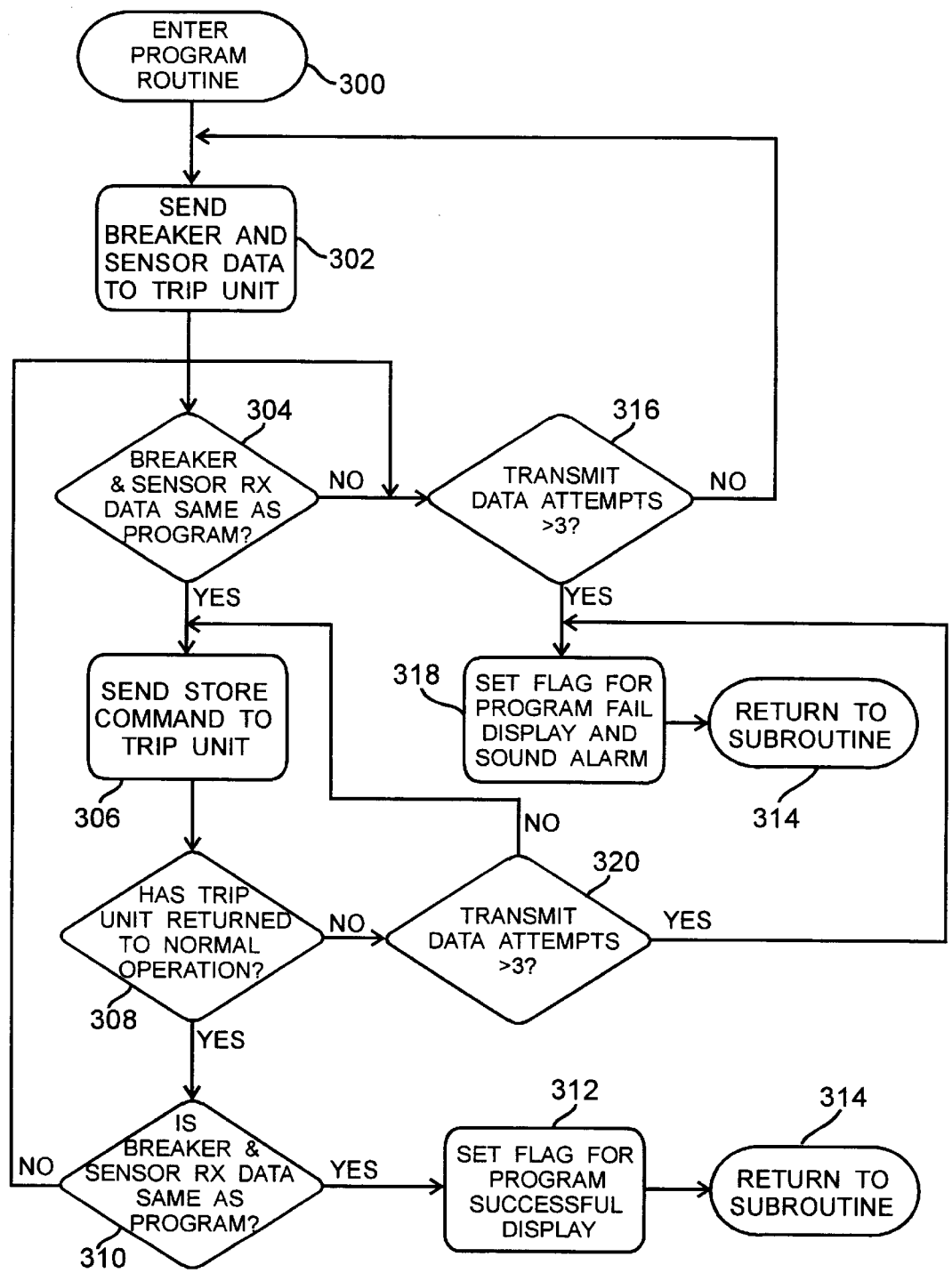

FIGS. 8–14 comprise a flow chart for implementing the microcontroller 12 of FIGS. 4–6. More specifically, FIG. 8 represents a flow chart for the main operating program of the microcontroller. FIGS. 9 and 11 constitute respective flow charts for interrupt routines which are respectively serviced in response to a timer which is internal to the microcontroller and in a response to data being received from the trip unit via the SCI (Serial Communication Interface) port of the microcontroller. The charts depicted in FIGS. 10 and 12–13 are subroutines which are respectively called in response to the reception of data messages, for periodically looking for keypad data and for periodically controlling the display. The subroutine of FIG. 14 is called in response to the initiation of the trip unit programming cycle.

The flow chart of FIG. 8 begins upon power-up as depicted at block 100. At blocks 102 and 104, the microcontroller initializes its various ports and system variables, including driving the output line (Battery-CTRL of U2, FIG. 12) which maintains the local power source in the "on" condition.

At block 106, the microcontroller performs a test to determine if its SCI data register is full. If the SCI data register is full, flow proceeds from block 106 to block 108 where the subroutine of FIG. 10 is serviced. Upon returning from the subroutine of FIG. 10 or from block 106 if the SCI data register is not full, flow proceeds to block 110.

At block 110, the microcontroller performs a test to determine if the display reset timer has timed out. The display reset timer from block 110 and other timers to be discussed in connection with this flow chart of FIG. 8 are controlled using the interrupt service routine of FIG. 9. The display reset timer is used to indicate when the display 13 (FIGS. 1 and 4) is ready to be controlled after power-up, since a 15 millisecond post-power-up delay is specified for the preferred LCD component. Accordingly, if the display reset timer is equal to 0, then the 15 millisecond delay has elapsed, and the microcontroller proceeds to block 112 to reset the LCD in preparation for subsequent use and to disable the timer.

At block 114, the microcontroller determines whether or not it is time to service the keypad. A keypad service timer, which is also maintained using the interrupt service routine of FIG. 9, is regularly decremented until it reaches 0, at which time the microcontroller proceeds to determine if any data had been entered via the keypad 11 (FIGS. 1 and 4). Thus, at block 116 the microcontroller performs a test to determine if all the keys have been serviced. This is determined by checking if the key-ready flag is set (see FIG. 12). If all the keys have been serviced, flow proceeds to block 118 where the microcontroller calls the keypad service subroutine of FIG. 12. From block 118, or if all the keys have not even serviced at block 116, flow proceeds to block 120 where the keypad service timer is restored to its original value. From block 120, flow proceeds to block 121. At block 121 a test is performed to determine if the On/Off key 52 (FIG. 1) has been pressed. If so, flow proceeds to block 126 where the power control bit (Battery_Ctrl of the microcontroller 12, see FIG. 12) is set low until the microcontroller loses power and the system shuts off. If the off key has not been pressed, flow continues to block 122.

At block 122 a test is performed to determine if the display reset timer has been disabled. If the display reset timer has been disabled, then the 15 millisecond delay after power-up has elapsed, and flow can proceed to block 124 where the display service subroutine of FIG. 13 is called for servicing the LCD. If the display reset timer has not been disabled, flow returns to block 106.

After the display service routine, the microcontroller performs a test at block 123 to determine if the programming routine should be run. If so, flow proceeds to block 125 as detailed in FIG. 14. From block 125, or in response to the program flag not being set, flow returns to block 106.

The timer interrupt service routine, which is depicted in FIG. 9, occurs each millisecond. The flow chart begins at block 132 and, at block 134, the microcontroller sets the output compare register to interrupt at the next millisecond.

At 133 the SCI communication loss timer is decremented. When the SCI has successfully received a new packet of data this timer is restored to its full count, indicating the programmer is receiving valid data from the trip unit and the display cursor should not flash.

At blocks 136, 138 and 140, the display-reset, keypad service and 125-millisecond timers are decremented. The 125-millisecond timer is used to decrement the display timer, which has a relatively long time period. At block 142, the microcontroller performs a test to determine if the 125-millisecond timer has been decremented to 0. If so, the 125 millisecond timer is refreshed and flow proceeds to blocks 144 to decrement the display timer. From block 144, and from block 142 if the 125-millisecond timer has not been decremented to 0, flow proceeds to block 148, where the microcontroller executes a return form interrupt command.

FIG. 10 illustrates a preferred manner of implementing block 108 of FIG. 8:

the SCI data subroutine. The subroutine is entered at block 152, and, at block 153, the microcontroller interprets the data packet received via the SCI port. The received data packet may be related to configuration data or operating-status data. Each such type of data corresponds to the type of multi-byte packet that is being sent from the trip unit. For further information concerning the data packet structure, reference may be made to U.S. Pat. No. 5,224,054, filed on Apr. 2, 1990, incorporated in its entirety by reference. If the received data is configuration data, flow proceeds from block 153 to block 154 where the configuration data memory locations are updated. If the received data is not configuration data, flow proceeds from block 153 to block 155 where a test is performed to determine if it is status data. If so, the status data memory locations are updated at block 156. At block 157, the microcontroller updates its record of the trip status. As discussed in U.S. Pat. No. 5,224,054, the trip status includes long time trip, short time trip, instantaneous trip, ground fault trip and normal operation. At block 158, the microcontroller clears the SCI data ready flag so that it can be informed the next time a data packet has been received via the SCI port. The microcontroller then executes a return from subroutine command, as depicted in block 160.

FIG. 11 illustrates the SCI interrupt routine, which is serviced each time a byte is received via the SCI port. Upon entering the routine at block 164, the microcontroller performs a test to determine if any errors have been received, depicted at block 166. If one or more errors were received via the SCI port, flow proceeds from block 166 to block 168 where the microcontroller resets the SCI port and an associated message byte counter, which is used to track how many bytes of a particular packet had been received so that errors are not accumulated. From block 168, flow proceeds to block 172 where the microcontroller executes a return from interrupt command.

If errors are not detected via block 166, flow proceeds to block 174 where a test is performed to determine if the received data byte constitutes the beginning of a data message. If not, flow proceeds to block 176 where the microcontroller stores the data byte and increments the data byte counter in order to track the number of received bytes in the instant packet. From block 176, flow proceeds to block 178 where a test is performed to determine if the received byte constitutes the end of a data message or packet. If the received byte does constitute the end of a data message, flow proceeds to block 180 where a test is performed to determine if there are any byte or bit errors in the packet that has been received. This is preferably done by performing a conventional checksum test. If the checksum test passes, flow proceeds to block 182 where the microcontroller sets the SCI data ready flag of block 158 (FIG. 10) to record that a packet had been received. From block 182, flow proceeds to block 183 where the microcontroller resets the SCI communication loss timer, signifying that it is receiving updated data from the trip unit. From block 183 flow proceeds to previously discussed block 168.

If the microcontroller determines that the received byte is the beginning of a data message or packet, flow proceeds from block 174 to block 184 where the microcontroller begins to form the packet by storing the beginning of the message and resetting the byte counter indicating the number of bytes that have been received for the packet. From block 184, from block 178 if the received byte does not constitute the end of a data message and from block 180 if the checksum test fails, flow proceeds to block 172, returning from the interrupt routine.

FIG. 12 illustrates the keypad service subroutine depicted in block 118 of FIG. 8. After entering the routine at block 188, flow proceeds to block 190 where the microcontroller reads the port at which the keypad (set of push-button switches) is connected. At block 192, the microcontroller determines if a push-button switch has been depressed or released by comparing the present state of the push-button switch port to its previous state. If the present and the previous states of the push-button switch port are the same, flow proceeds from block 192 to block 194 where the microcontroller executes a return from subroutine command.

If the microcontroller determines that a push-button switch has been depressed or released, flow proceeds from block 192 to block 196 where the microcontroller once again reads the same port. At this point in the flow chart, the microcontroller initiates a switch debouncing procedure. If the microcontroller reads the push-button switch port three times and concludes that the data in the port has not changed at each one of the three reads, then the switch has been debounced. Thus, from block 196, flow proceeds to block 198 where the microcontroller makes the first comparison. From block 198, flow proceeds to block 200 if the successive data port reads are not the same.

At block 200 a counter, which is used for tracking the number of times the comparison has been made, is cleared. If the successive reads at block 198 are the same, flow proceeds from block 198 to block 202 where the counter is incremented.

From block 202, flow proceeds to block 204 where a test is performed to determine if three successive reads have taken place with the same data being read at the port. If not, flow returns from block 204 to block 196 for the next successive read of the push-button switch port.

From block 204, flow proceeds to block 206 where a test is performed to determine if the push-button switch has been released. If the push-button switch has been released, flow proceeds to block 208 where the microcontroller updates a register storing the status of the associated push-button switch and sets a key ready flag to record that a switch has been pressed and released, the latter of which must happen for the microcontroller to act on the data input by the user. From block 206, if the switch has not been released by this time, flow proceeds to block 194 where the microcontroller executes a return from subroutine command.

FIG. 13 illustrates the display service subroutine which is depicted at block 124 of FIG. 8. The subroutine of FIG. 13 changes information on the display in response to: the 500 millisecond timer timing out, a user request via the keypad, or trip unit data requiring a change. Preferably, there are three types of display modes, a current-related mode, a configuration mode with six subtypes associated with the configuration mode and a program mode. The current-related information mode displays the amperage for each of three phases plus ground fault. The configuration submodes display: (1) identification of breaker type, current sensor size and amperage rating; (2) long time trip settings, pick-up settings in amperes and delay time; (3) short-time trip settings, pick-up settings in amperes and delay time; (4) instantaneous trip pick-up settings; (5) ground fault trip settings, pick-up settings in amperes and delay time; and (6) the revision number for the hardware and firmware.

After entering the subroutine at block 210 of FIG. 13, flow proceeds to block 212 to determine if a flag has been set indicating that another portion of the display needs to be written. Only one portion of the display is written at a time. If other portions of the display have not been written, then the display is still in progress. If another display portion needs to be written, flow proceeds from block 212 to block 214 where the microcontroller updates the display using conventional line-by-line LCD writing techniques. From block 214, flow proceeds to block 216 where the microcontroller performs a return from subroutine command.

From block 212, flow proceeds to block 218 if a display update is not in progress to determine if the key-ready flag is set (see block 208 of FIG. 12). If the key-ready flag is set, then a key or switch was detected as being depressed and released, and flow proceeds to block 220.

If the key-ready flag is not set, flow proceeds from block 218 to block 246 where the microcontroller performs a test to determine if it is receiving data from the trip unit by checking an SCI data loss flag. If there is no new SCI data within a predetermined time period as indicated by the data loss flag, then flow proceeds to block 248 where the display is instructed to begin flashing the cursor, warning the operator of a transmission loss. After the cursor is set to blink, or if new SCI data is being received, flow proceeds to block 250 where the microcontroller performs a test to determine if current-related information is being displayed: for example, the display of current in each of the three phases and ground fault current.

If the display is not displaying current-related information, flow proceeds from block 250 to block 254 where the microcontroller performs a test to determine if the display is displaying configuration information and the configuration requires changing. If at least one of these conditions is not met, no further action is necessary and flow proceeds to block 216 for exiting the subroutine. If both of these conditions are met, flow proceeds from block 256 to block 258 where the microcontroller sets up for writing the new display during this visit to the display service routine and the remaining portion during the next visit. From block 258, flow proceeds to block 214 for writing the new configuration data on the display.

From block 250, flow proceeds to block 252 if the information being displayed is current-related information. At block 252, the current-related information is set for being updated (or refreshed) by setting a flag to record that updates should only pertain to the numbers, e.g., the displayed amperages for the various phases and ground fault. This updating or refreshing in the display mode for "current" is set to occur every 500 milliseconds. From block 252, flow proceeds to block 214 for the actual refreshing of the current-related information on the display.

At block 220 the microcontroller checks if the program key has been pressed. If so, a flag is set at 222 to execute the program subroutine detailed in FIG. 14. After setting the program flag, or if the program key has not been pressed, flow continues to block 224. At 224, the microcontroller tests if the program cycle is underway, and if so, flow proceeds to block 225. At 225 a test is made to determine if it is the start of the program routine, and if so, flow proceeds to 214 where the maintenance routine changes the display to indicate that programming is in process. At 225, if it is not the start of the programming routine, flow is to 216 to execute a return from subroutine. At 224, if the program cycle is not in process, the microcontroller then tests for the FUNCTION key 54 (FIG. 1) press at block 226.

If the push-button switch corresponding to the FUNCTION key is detected as being depressed and released, flow proceeds to block 228 where the microcomputer changes the display to the next display type. For example, from "program set" display to "current" display, to configuration display and back to program set display. From block 228, flow proceeds to block 214 where the display is actually written to for the change indication of block 228.

If the microcontroller determines no FUNCTION key press was made at 226, it next tests for a press of the BREAKER/PANE key 56 (FIG. 1) at block 230. If there was none, flow proceeds to block 234. Otherwise it proceeds to 232 where a test is made to determine if the display is in the current mode. If so, flow is to block 214. If it is not a current display, a test is made at 240 for configuration display. If it is a configuration display, flow proceeds to block 242. At this point the microcontroller advances the display type to the next of six submodes(panes), for example from the long time trip settings pane to the short time trip settings pane. If the last of the six submodes is displayed, a transition to the first submode is displayed.

At block 240, if the display is not configuration, flow proceeds to 238 where the microcontroller deduces that since it is also not current display it must be a program set display. Furthermore, since the BREAKER/PANE key was pressed, the next breaker type is selected from a table in memory and is set up to be written to the display at block 214. If the breaker type displayed is the last in the table, the display setup returns back to the first one in the table.

At block 234 a test is made to determine if the SENSOR key 58 (FIG. 1) was pressed. If not, flow proceeds to 214. If the SENSOR key was pressed, a test is made to determine if the display is set for program. If it is, the next higher sensor ampere size is selected from a table in memory. Only legitimate sensor sizes available for the breaker type displayed can be selected from the table. If the maximum sensor size available for the breaker type is already displayed, the minimum size will be displayed next. At block 238, the sensor size is set up to be written to the display at block 214. At block 236, if the display was not program, the microcontroller ignores the key press, and returns from subroutine.

FIG. 14 illustrates the program routine which is depicted at block 125 of FIG. 8. During the trip unit programming cycle, the subroutine of FIG. 14 controls download of the circuit breaker and sensor codes to the trip unit, and sets flags indicating the results of the operation.

After entering the program routine at block 300, flow proceeds to block 302 where the circuit breaker and sensor codes corresponding to the values selected and displayed are written to the transmit serial communications port. At block 304, a test is made to determine if the circuit breaker and sensor codes received back from the trip unit via the receive serial communication data port are the same values as indicated by the program display. If not, flow proceeds to block 316 where it is determined if there have been more than three attempts to send data to the trip unit. If not, flow returns to block 302 and the process is started over. If the number of unsuccessful attempts exceeds three, flow proceeds to block 318 where a flag is set to display a program failed message and to sound an alarm, after which a return from subroutine is executed. Although the preferred mode of operation is to verify that trip unit actually was programmed as requested, the programming device could function properly without this verification procedure.

At block 304, if the data agrees, flow proceeds to block 306 where a code to store the previously downloaded data is transmitted to the trip unit. Flow then proceeds to block 308 where it is determined from the data packets whether the trip unit has left the program mode (i.e., is sending all data packets) and has returned to normal operation. If it has not, flow proceeds to block 320 to determine if the total number of data transmissions to the trip unit exceeds three. Three is the total number of times the programmer has attempted to send the breaker and sensor codes plus the number of times it has tried to send the store data code. If the number of transmit data attempts exceeds three, it is assumed that there is transmission or reception difficulty and therefore the programming cycle should be aborted and not allowed to go on indefinitely. If the number of transmit attempts does not exceed three, flow returns to block 306 to re-send the store data code. If the transmit attempts exceeds three, flow is to block 318 to signal a program failure as previously discussed. At block 308, if it is determined that the trip unit has returned to its normal operating mode, flow proceeds to block 310 where a final test is made to determine whether the trip unit actually stored the correct circuit breaker and sensor codes in its EEPROM. If the circuit breaker or sensor codes differ from the displayed values, flow returns to block 316 to start the program cycle all over, provided that the total transmit data attempts does not exceed three. At block 310, if the final data test passes, flow proceeds to block 312, where a flag is set to momentarily flash the successful result of the programming cycle on the display prior to returning to the program set display.

For completeness in the disclosure of the above-described portable programming device but not for the purpose of limitations, the following representative values and component identifications are submitted. These values and components were employed in the preferred embodiment of the invention described herein.

| Ref. Des. | Description | Mfr./Part No. |
|---|---|---|
| J1 | Ext Power Jack | Switchcraft #RAPC722 |
| J3 | PCB Connector, 14 cond ribbon | 3M #3914-0000T |
| J4 | 4 Cond Telephone Jack | Molex #90077-1077 |

-continued

| Ref. Des. | Description | Mfr./Part No. |
|---|---|---|
| J5 | PCB Connector, 8 cond ribbon | 3M #3908-0000T |
| JP-1 | 14 Conductor Ribbon Cable | Belden #9R28014 |
| JP-2 | 8 Conductor Ribbon Cable | Belden 9R28014 (Strip to 8 Conductor) |
| (Ref J2) | 9 V Cell Holder | Bogen # BS6I-ND |
| Q1 | MOS Transistor | Siliconix VP0808L |
| Q2,3 | TMOS FET | Motorola # BS170 |
| CR1,2,5,6,8 | Schottky Diode | Motorola 1N5819 |
| CR3,4 | Signal Diode | 1N4148 |
| CR7 | Zener Diode, 27 V, ½ W | Motorola 1N5254 |
| CR9 | Transient Suppressor, 39 V | Motorola 1N6285 (1.5KE39) |
| CR10,11 | Transient Suppressor, 10 V | Motorola 1N6271 (1.5KE10) |
| CR12 | Fiber Optic Photo Det | Motorola # MFOD71 |
| U1 | VMOS Quad Pack | Siliconix VQ1000J |
| U2 or 12 | Microcontroller | Motorola # 68HC705C8S |
| U3 | 5 Volt Regulator | National LP2950ACZ5.0 |
| U4 | Dual Op Amp | Motorola # LM358N |
| U5 | 2K SPI Serial EEPROM | Xicor # X25CO2 |
| U6 | Voltage Converter | Maxim # 1CL7660CPA |
| U7 | Power On Reset Circuit | Motorola MC33064P-5 |
| U8 | Switching Regulator IC | Motorola UA78S40PC |
| U9 | Adjustable Regulator | Texas Instrument # TL783C |
| LS1 | Piezo Alarm | Murata Erie # PKB24SPC3601 |
| L1 | Inductor 470 uH, 0.3 Adc minimum | Wilco #ITS471 |
| C1 | Tantalum Cap, 16 V, 100 mf | Sprague # 199D107X0016FE2 |
| C2,5,6,9 | Ceramic Dipped Cap, 100 V, 0.1 mf | Kemet # C330C104K1R5CA |
| C3,4 | Ceramic Dipped Cap, 100 V, 22 pf | Kemet # C315220K1G5CA |
| C7,8 | Electrolytic Cap, 50 V, 10 mf | Sprague # 515D106M050JA6A |
| C10 | Electrolytic Cap, 220 mf, 25 V | Panasonic type NHE (Digikey #P5245) |
| C11 | Ceramic Dipped Cap, 560 pf, 200 V | Kemet #C322C561K2G5CA |
| C12 | Electrolytic Cap, 1000 mf, 50 V, Axial Lead | Panasonic type NHE (Digikey #P5477) |
| Y1 | 4.0 MHZ AT Cut Crystal | Nymph # NY040-20 (HC-18/U) |
| R15 | Resistor, 1 W Met Oxide Film, 0.47 Ohm | Yageo (Digikey # 0.47W-1) |
| R22,R4 | Resistor, ¼ W Carbon Film, 28 Ohm | Digikey |
| R3 | Resistor, ¼ W Carbon Film, 270 Ohm | Digikey |
| R16 | Resistor, ¼ W Carbon Film, 560 Ohm | Digikey |
| R4 | Resistor, ¼ W Carbon Film, 4.7K | Digikey |
| R1,10,21 | Resistor, ¼ W Carbon Film, 10K | Digikey |
| R2,19,20 | Resistor, ¼ W Carbon Film, 47K | Digikey |
| R5,7,8,12–14 | Resistor, ¼ W Carbon Film, 100K | Digikey |
| R17,18 | Resistor, ¼ W Carbon Film, 240K | Digkey |
| R11 | Resistor, ¼ W Carbon Film, 470K | Digikey |
| R9 | Resistor, ¼ W Carbon Film, 1.5M | Digikey |
| R6 | Resistor, ¼ W Carbon Film, 10M | Digikey |
| R23 | Pot, Cermet, 1 turn, 10K | Bourns #3386X |
| RP1 | Resistor Pack, 100K, 7 Res, Comm Lead | Allen-Bradley # 708A |
| RP2 | Resistor Pack, 100K, 5 Res Individual | Allen-Bradley # 710B |
| SW1–SW5 | Momentary Pushbutton Switch | Panasonic # EVQ-QS205K |

While the invention has been particularly shown and described with reference to a particular embodiment, various modifications may be made. It will be recognized by those skilled in the art that various modifications and changes may be made to the present invention described above without departing from the spirit and scope of the invention as defined by the appended claims.

What is claimed is:

1. A programming device for programming a circuit breaker trip unit, comprising:

a keypad;

a display;

a local power source for providing power to the programming device;

interface means for coupling data sent to and from the trip unit with the programming device;

a control circuit, which interprets signals received from the keypad, for controlling the display and transmitting data to the trip unit, the data functions to program the trip unit with circuit breaker tripping characteristics which are provided to the control circuit from the keypad; and verifying means for verifying that the trip unit was programmed with the circuit breaker tripping characteristics.

2. A programming device, according to claim 1, wherein the control circuit requests and receives data from the trip unit.

3. A programming device, according to claim 1, further including a power switch, coupled to the local power source, for disabling the local power source when external power is provided to the programming device.

4. A programming device, according to claim 1, wherein the control circuit includes a microcomputer.

5. A programming device, according to claim 1, further including an EEPROM.

6. A programming device, according to claim 1, wherein the keypad includes a plurality of momentary switches.

7. A programming device, according to claim 6, wherein the plurality of momentary switches includes a first switch to select one of a plurality of display modes and a second to select one of a plurality of submodes associated with one of the plurality of display modes.

8. A programming device, according to claim 6, wherein the plurality of momentary switches includes at least one switch that instructs the control circuit to transmit data containing the circuit breaker operating characteristics to the trip unit.

9. A programming device, according to claim 2, further having an alerting means, responsive to the control circuit, for alerting an operator, of the programming device, when data communication with the trip unit has been disrupted.

10. A programming device, according to claim 1, wherein the interface means includes a fiber optic cable.

11. A programming device, according to claim 1, wherein the interface means includes means for providing power to the trip unit.

12. A programming device, according to claim 2, wherein the control circuit requests that the trip unit send the circuit breaker tripping characteristics, which it received from the control circuit, receives the circuit breaker tripping characteristics from the trip unit and verifies that the circuit breaker tripping characteristics received from the trip unit are the circuit breaker tripping characteristics which the control circuit sent to the trip unit.

13. A programming device, according to claim 12, further having an alarm means for alarming an operator, of the programming device, that the trip unit was not programmed with the circuit breaker tripping characteristics which were transmitted by the portable programming device.

14. A programming device, according to claim 12, further having a visual alarm means which is displayed on the display to notify an operator, of the programming device, that the trip unit was not programmed with the circuit breaker tripping characteristics which were transmitted by the portable programming device.

15. A programming device, according to claim 13, wherein the alarm means includes an audible alarm coupled to an alarm circuit which is coupled to the control circuit.

16. A portable programming device for programming a circuit breaker trip unit, comprising:
   a keypad;
   a display;
   interface means for coupling data sent to and from the trip unit with the portable programming device;
   a local power source for providing power to the portable programming device and the trip unit;
   a power switch, coupled to the local power source, configured for disabling the local power source in response to the presence of an external power source; and
   a microcomputer circuit for a) interpreting signals received from the keypad, b) controlling the display, c) transmitting data to the trip unit which programs the trip unit with circuit breaker tripping characteristics which are provided to the microcomputer circuit from the keypad, d) requesting the trip unit send the circuit breaker tripping characteristics, which it received from the microcomputer circuit, e) receiving the circuit breaker tripping characteristics from the trip unit and f) verifying that the circuit breaker tripping characteristics received from the trip unit are the circuit breaker tripping characteristics which the microcomputer circuit sent to the trip unit.

17. A portable programming device, according to claim 16, wherein the keypad includes a plurality of momentary switches.

18. A portable programming device, according to claim 17, wherein the plurality of momentary switches includes a first switch to select one of a plurality of display modes and a second to select one of a plurality of submodes associated with one of the plurality of display modes.

19. A portable programming device, according to claim 17, wherein the plurality of momentary switches includes at least one switch that instructs the control circuit to transmit data containing the circuit breaker operating characteristics to the trip unit.

20. A portable programming device, according to claim 16, wherein the interface means includes means for electrically isolating the data transmitted and received by the portable programming device.

21. A programming device, according to claim 16, further having an alerting means, responsive to the control circuit, for alerting an operator, of the programming device, when data communication with the trip unit has been disrupted.

22. A portable programming device, according to claim 16, wherein the interface means includes a fiber optic cable.

23. A portable programming device, according to claim 16, further having an alarm means, responsive to the microcomputer circuit, which alarms an operator, of the portable programming device, that the trip unit was not programmed with the circuit breaker tripping characteristics which were transmitted by the portable programming device.

24. A programming device, according to claim 16, further having a visual alarm means which is displayed on the display to notify an operator, of the programming device, that the trip unit was not programmed with the circuit breaker tripping characteristics which were transmitted by the portable programming device.

25. A portable programming device, according to claim 16, further including an EEPROM.

26. A portable programming device, according to claim 16, wherein the interface means provides power to the trip unit.

27. A programming device, according to claim 16, further having an audible alarm means for notifying an operator, of the programming device, that the trip unit was not programmed with the circuit breaker tripping characteristics which were transmitted by the portable programming device.

28. A programming device, according to claim 23, wherein the alarm means includes an alarm circuit coupled to the microcomputer circuit.

29. A programming device, according to claim 28, further including a piezo alarm coupled to the alarm circuit.

30. A portable programming device for programming a circuit breaker trip unit with circuit breaker tripping characteristics, comprising:
   a keypad;
   a display;
   interface means for coupling data sent to the trip unit with the portable programming device;
   a microcomputer circuit, which interprets signals received from the keypad, controls the display, transmits the circuit breaker tripping characteristics to the trip unit, and requests and receives data from the trip unit;
   verifying means for verifying that the trip unit was programmed with the circuit breaker tripping characteristics; and
   alarm means, responsive to the microcomputer circuit, for notifying a user that the trip unit was not programmed with the circuit breaker tripping characteristics.

31. A portable programming device, according to claim 30, further including a local power source which provides power to the programming device and the trip unit.

32. A portable programming device, according to claim 31, further including a power switch, coupled to the local power source, configured to disable the local power source in response to the presence of an external power source.

33. A portable programming device, according to claim 30, further having an alerting means, responsive to the microcomputer circuit, for alerting an operator, of the programming device, when data communication with the trip unit has been disrupted.

34. A portable programming device, operated by a user, for performing a programming procedure which programs a circuit breaker trip unit with circuit breaker tripping characteristics, comprising:

a keypad;

a display;

interface means for coupling data sent to the trip unit with the portable programming device;

a microcomputer circuit, which interprets signals received from the keypad, controls the display, transmits the circuit breaker tripping characteristics to the trip unit, and requests and receives data from the trip unit;

verifying means for verifying the accuracy of the programming procedure;

alarm means, responsive to the microcomputer circuit, for notifying the user that the programming procedure was not successful;

a local power source which provides power to the programming device and the trip unit;

a power switch, coupled to the local power source, configured to disable the local power source in response to the presence of an external power source.

35. A programming device for programming a circuit breaker trip unit, comprising:

a keypad;

a display;

a local power source which provides power to the programming device;

interface means for coupling data sent to and from the trip unit with the programming device; and a control circuit for a) interpreting signals received from the keypad, b) controlling the display, c) transmitting data to the trip unit which programs the trip unit with circuit breaker tripping characteristics which are provided to the control circuit from the keypad, d) requesting the trip unit send the circuit breaker tripping characteristics, which it received from the control circuit, e) receiving the circuit breaker tripping characteristics from the trip unit and f) verifying that the circuit breaker tripping characteristics received from the trip unit are the circuit breaker tripping characteristics which the control circuit sent to the trip unit.

36. A programming device, according to claim 35, further including a power switch, coupled to the local power source, for disabling the local power source when external power is provided to the programming device.

37. A programming device, according to claim 35, wherein the keypad includes a plurality of momentary switches.

38. A programming device, according to claim 37, wherein the plurality of momentary switches includes a first switch for selecting one of a plurality of display modes and a second switch for selecting one of a plurality of submodes associated with one of the plurality of display modes.

39. A programming device, according to claim 37, wherein the plurality of momentary switches includes at least one switch that instructs the control circuit to transmit data containing the circuit breaker operating characteristics to the trip unit.

40. A programming device, according to claim 35, further having an alerting means, responsive to the control circuit, for alerting an operator, of the programming device, when data communication with the trip unit has been disrupted.

41. A programming device, according to claim 35, wherein the interface means includes a fiber optic cable.

42. A programming device, according to claim 35, wherein the interface means includes means for providing power to the trip unit.

43. A programming device, according to claim 35, further having an alarm means for alarming an operator, of the programming device, that the trip unit was not programmed with the circuit breaker tripping characteristics which were transmitted by the portable programming device.

44. A programming device, according to claim 35, further having a visual alarm means, which is displayed on the display, for notifying an operator, of the programming device, that the trip unit was not programmed with the circuit breaker tripping characteristics which were transmitted by the portable programming device.

45. A programming device, according to claim 43, wherein the alarm means includes an audible alarm coupled to an alarm circuit which is coupled to the control circuit.

46. A programming device, according to claim 35, wherein the control circuit includes a microcomputer.

47. A programming device, according to claim 35, further including an EEPROM.

48. A portable programming device for programming a circuit breaker trip unit with circuit breaker tripping characteristics, comprising:

a keypad;

a display;

interface means for coupling data sent to the trip unit with the portable programming device;

a microcomputer circuit, which interprets signals received from the keypad, for a) controlling the display, b) transmitting the circuit breaker tripping characteristics to the trip unit, and c) requesting and receiving data from the trip unit;

verifying means for verifying that the trip unit was programmed with the circuit breaker tripping characteristics;

alarm means, responsive to the microcomputer circuit, for notifying a user that the trip unit was not programmed with the circuit breaker tripping characteristics;

a local power source for providing power to the programming device and the trip unit; and a power switch, coupled to the local power source, configured to disable the local power source in response to the presence of an external power source.

49. A portable programming device, according to claim 48, further having an alerting means, responsive to the microcomputer circuit, for alerting an operator, of the programming device, when data communication with the trip unit has been disrupted.

* * * * *